United States Patent [19]

Nakazawa et al.

[11] Patent Number: 5,268,678
[45] Date of Patent: Dec. 7, 1993

[54] MATRIX-TYPE DISPLAY DEVICE

[75] Inventors: Kiyoshi Nakazawa, Fujiidera; Mikio Katayama, Ikoma; Hiroaki Kato, Nara; Yuzuru Kanemori, Tenri; Takayoshi Nagayasu, Nara; Hidenori Negoto, Ikoma, all of Japan

[73] Assignee: Sharp Kabushiki Kaisha, Osaka, Japan

[21] Appl. No.: 540,594

[22] Filed: Jun. 20, 1990

[30] Foreign Application Priority Data

| Jun. 20, 1989 | [JP] | Japan | 1-157956 |
| Aug. 29, 1989 | [JP] | Japan | 1-224191 |
| Aug. 29, 1989 | [JP] | Japan | 1-224192 |
| Sep. 12, 1989 | [JP] | Japan | 1-235991 |
| Mar. 9, 1990 | [JP] | Japan | 2-59406 |

[51] Int. Cl.[5] .............................. G09G 3/36
[52] U.S. Cl. ............................. 345/93; 345/103
[58] Field of Search ............ 340/719, 784, 811; 350/332, 333; 359/54, 55

[56] References Cited

U.S. PATENT DOCUMENTS

| 4,688,896 | 8/1987 | Castleberry | 340/784 |
| 4,789,857 | 12/1988 | Maurice | 340/784 |
| 4,807,973 | 2/1989 | Kawasaki | 340/784 |
| 4,840,459 | 6/1989 | Strong | 340/784 |

FOREIGN PATENT DOCUMENTS 0124825  5/1989  Japan ........................... 340/784

OTHER PUBLICATIONS

Society for Information Display, International Symposium, Digest of Technical Papers vol. XIX, May 24, 1988, Anaheim, California, US pp. 232-234; Castleberry et al.
Patent Abstracts of Japan vol. 10, No. 198 (P-476) (3354) Jul. 11, 1986 & JP-A-61 41 126 (Canon) Feb. 27, 1986; Enomoto.

Primary Examiner—Ulysses Weldon
Assistant Examiner—M. Fatahiyar
Attorney, Agent, or Firm—Nixon & Vanderhye

[57] ABSTRACT

A matrix-type display device includes a display electrode board that has a plurality of pixel electrodes arranged into a matrix. A set of scan lines extend in parallel in one direction and a set signal lines extend in an orthogonal direction so that these lines are arranged between adjacent pixel electrodes. A spare line intersects at least some of the scan lines and/or said signal lines at each end of said set of lines so as to sandwich an insulating film therebetween, and a lead-out line is connected to one end of the spare line. The lead-out lines are connected to external connecting lines, which are outside of the display electrode board, so that the lead-out lines can be connected to each other through said connecting lines. Line breakdowns can be corrected and the correction of the breakdowns entails little or no increase in load capacity, electrical resistance, and noise with respect to the corrected line.

9 Claims, 20 Drawing Sheets

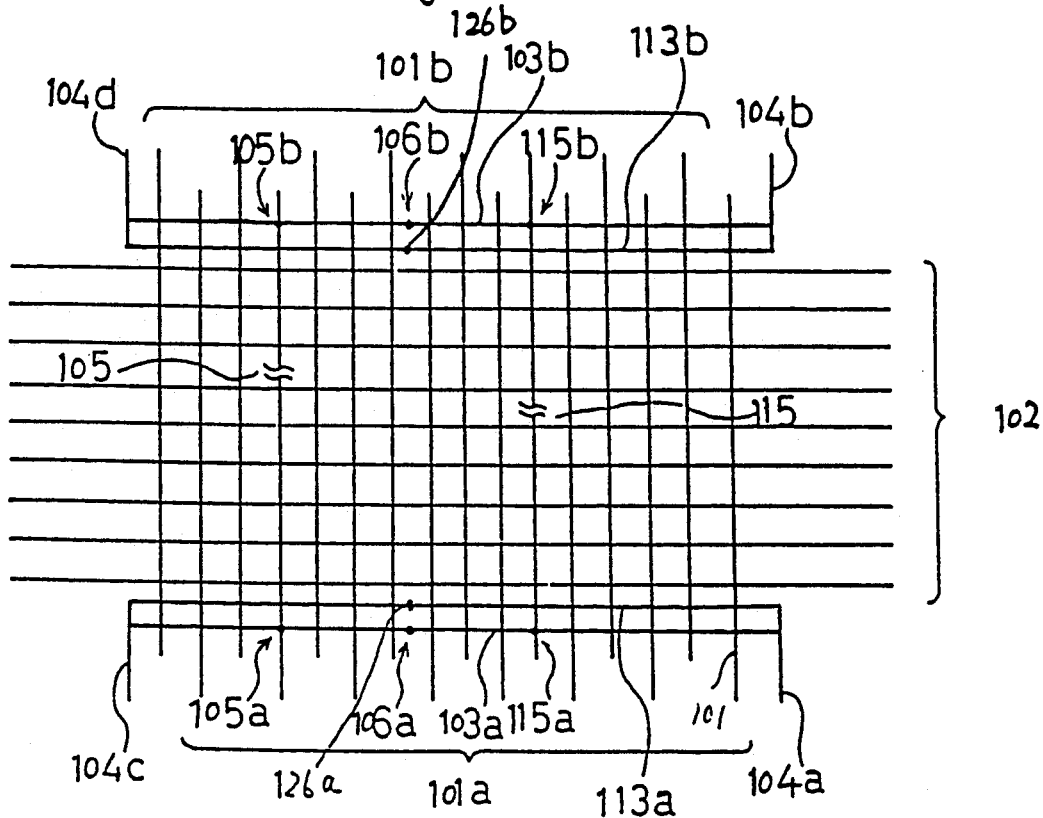
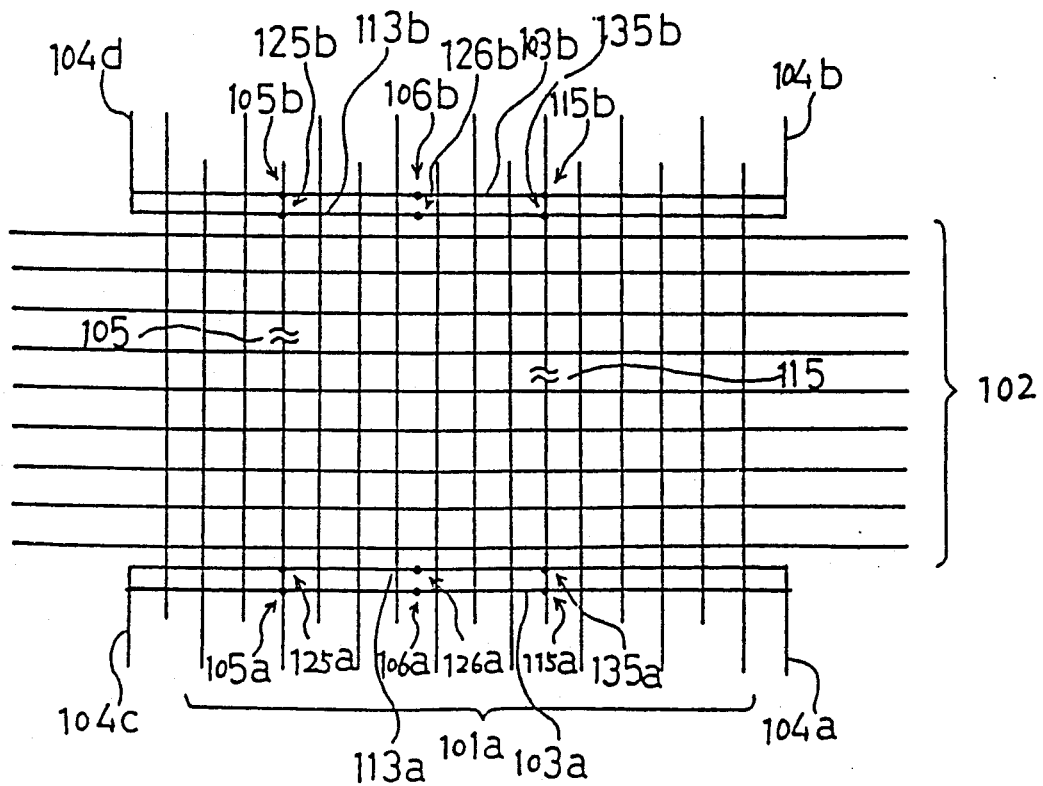

MATRIX-TYPE DISPLAY DEVICE

BACKGROUND OF THE INVENTION

1. Field of the Invention

The present invention relates to a matrix-type display device having a function to correct bus line break troubles.

2. Description of the Prior Art

As image display devices replace CRTs (cathode ray tubes), matrix-type display devices utilizing liquid crystals, EL emitters, plasma beam emitters, or the like are attracting attention. In particular, liquid crystal display devices are widely used in various applications, such as portable TV sets, word processors, and personal computers. It is desired that display devices employed in these applications be more sophiscated and larger in size.

In order to enable minute images to be displayed by employing a matrix-type display device, it is necessary that picture elements constituting a matrix be smaller in size and much greater in number. An increase in the number of picture elements requires an increase in the number of bus lines that function as scan and signal lines. The larger the number of bus lines, the more is line breaking likely to occur. Moreover, as display devices become larger in size, bus lines become larger in length. As such, it is now increasingly becoming difficult to fabricate break-free bus wiring.

There has been developed a matrix-type display device having a function to correct bus-line breaks. A circuit diagram for a display electrode board as used in the display device is shown in FIG. 15A. A large number of source bus lines 1 extending in parallel are arranged in orthogonal relation to a large number of gate bus lines 2 extending in parallel in a direction. Each gate bus line 2 and each source bus line 1 function as a scan line and a signal line, respectively, and intersect each other in a non-conducting state so as to sandwich a gate insulation film 23 (FIG. 15B) therebetween which will be described hereinafter. Each rectangular area defined by adjacent gate bus lines 2 and adjacent source bus lines 1 has a pixel electrode 12. A liquid crystal is sealed between the pixel electrode 12 and the counter electrode 121 to form a liquid crystal cell 16. A thin film transistor (hereinafter to be referred to as "TFT") 11, as a switching element, is connected to each pixel electrode 12. A gate electrode 13 of and a source electrode 14 of each TFT 11 are respectively connected to the gate bus line 2 and to the source bus line 1. The TFT 11 has a drain electrode 15 connected to the pixel electrode 12.

Spare lines 3 are placed along the outer limits of the entire area in which gate bus lines 2 and source bus lines 1 intersect one another. The spare lines 3 comprise two spare lines 3a and 3c parallel to the gate bus lines 2 and two spare lines 3b and 3d parallel to the source bus lines 1. The four spare lines 3a, 3c, 3b, 3d are electrically connected to one another.

FIG. 15B shows a sectional view taken along a gate bus line 2 at point B in FIG. 15A. A base coat film 5 is deposited on the entire surface of a glass substrate 25, and a gate bus line 2 is pattern-formed on the base coat film 5. A gate insulation film 23 is deposited on the entire surface of the gate bus line 2, and the spare line 3b is placed on the gate bus line 2 in an intersecting relation therewith so as to sandwich the gate insulation film 23 therebetween. Further, on the entire surface of the spare line 3b there is formed a protective film 26.

FIG. 15C shows a section taken along a source bus line 1 at point C in FIG. 15A. The spare line 3a is pattern-formed on the above mentioned base coat film 5, and the above mentioned gate insulation film 23 is placed on the entire surface of the spare line 3a. A source bus line 1 is placed on the spare line 3a in an intersecting relation therewith so as to sandwich the gate insulation film 23 therebetween.

In a display electrode board having such a circuit, a breakdown caused to any gate bus line 2 or source bus line 1 is recognized as a line defect on a display screen, and it constitutes a big factor which can decrease the display yield. In this display electrode board, any breakdown caused to the gate bus lines 2 or source bus lines 1 is corrected by using the spare lines 3. For example, as FIG. 15A shows, where a breakdown spot 4 is present on one source bus line 1x, the defective source bus line 1x and the spare bus lines 3a and 3c are electrically connected at points 4a and 4b where both ends of the defective source bus line 1x intersect the spare lines 3a and 3c respectively. This connection is effected by applying energy such as a laser beam to the intersecting points 4a and 4b to thereby destroy the gate insulation film 23. Through such a connection at two points, portions of the defective source bus line 1x at both sides of the breakdown spot 4 are electrically connected via the spare lines 3a, 3c, and 3d.

However, such a way of correction gives rise to the following problems. First, the problem of load capacity can be pointed out. The load capacity $C_2$ of the source bus line 1x to which the spare lines 3 are connected (hereinafter to be referred to as "corrected source bus line") equals a value corresponding to the normal load bus capacity $C_0$ of the source bus line 1 plus the load capacity $C_1$ of the spare lines 3. That is, $C_2 = C_0 + C_1$. The length of the spare lines 3 is about equal to the total length of two gate bus lines 2 and two source bus lines 1 and, therefore, the value of the load capacity $C_1$ is considerably larger than that of $C_0$. The capability of a driver IC which supplies signals to pixel electrodes 12 through the source bus lines 1 is designed on the basis of the normal load capacity $C_0$ of the source bus lines 1 and, therefore, it is insufficient for driving the pixel electrodes 12 through the corrected source bus line 1x which has such a large load capacity $C_2$. Therefore, picture elements formed by the pixel electrodes 12 connected to the corrected source bus line will display themselves in a condition different from those formed by pixel electrodes 12 connected to other normal source bus lines 1. As such, even though correction is made by means of the spare lines 3 in the above mentioned manner, it cannot be said that the breakdown spot 4 has been completely corrected.

Secondly, the problem of signal delay is pointed out. Assuming that signals are supplied from one end nearer to the intersecting point 4b on the corrected source bus line 1x, signals are supplied through the spare lines 3 to the portion between the breakdown spot 4 of the corrected source bus line 1x and the intersecting point 4a. Each signal is transmitted over a longer distance than other normal source bus lines 1 until it reaches the intersecting point 4a. In this way, the total length of the corrected source bus line is longer than the normal source bus lines 1, which involves greater electrical resistance, resulting in signal delay. Picture elements formed by the pixel electrodes 12 suffering from considerable delay in signal input will display themselves in a condition different from those formed by pixel electrodes 12 connected to other normal source bus lines 1. As such, even though correction is made by means of the spare lines 3 in the above mentioned manner, it cannot be said that the breakdown spot 4 has completely been corrected.

Thirdly, the problem of signal noise is pointed out. Since the spare lines 3 intersect all of the gate bus lines 2 and source bus lines 1, the corrected source bus line 1x connected to the spare lines 3 are subject to the influence of signals on these many bus lines which intersect the spare lines 3. The effect of these signals extend to the spare lines 3, with a result that noise is produced. This noise is considerably larger than any possible noise from normal source bus lines 1 having no portion intersecting other source bus lines 1. Therefore, picture elements formed by the pixel electrodes 12 connected to the corrected source bus line 1x may display themselves in a condition different from those formed by other normal pixel electrodes 12. In such a case, if correction is made by means of the spare lines 3 in such a manner as mentioned above, the breakdown spot 4 cannot completely be corrected.

Any or all of the foregoing problems will occur noticeably as the display device becomes larger in size. Since, as stated above, line breaks are more likely to occur with an increase in the size of the display device, the necessity of solving the foregoing problems becomes greater as the size the display device becomes larger.

Fourthly, in display devices having the above-mentioned spare lines 3, the trouble of defective isolation is likely to occur between the spare lines 3 and the gate bus lines 2 or source bus lines 1. If a spare line 3 on which such a defective isolation problem is present is used to correct the breakdown spot 4, such correction may result in a new defect being caused to other part or parts. For example, at the intersecting point 4c shown in FIG. 15A, let it be assumed that a defective insulation problem is present between the source bus line 1y and the spare line 3a. Where such a defect is present, if the defective source bus 1x on one hand and the spare lines 3a and 3c on the other are interconnected at intersecting points 4a and 4b as earlier mentioned, the source bus lines 1x and 1y are electrically connected, with a result that a line defect is caused to the picture elements connected to the source bus line 1y. In display devices in which such spare lines 3 are provided, possible troubles of defective isolation between the spare lines and the bus lines pose a serious problem.

SUMMARY OF THE INVENTION

A matrix-type display device of this invention, which overcomes the above-discussed and numerous other disadvantages and deficiencies of the prior art, comprises a display electrode board that has a plurality of pixel electrodes arranged into a matrix and a set of scan lines extending in parallel in a direction and a set of signal lines extending in an orthogonal relation with said scan lines so that these lines are arranged between the adjacent pixel electrodes, a spare line that intersects at least some of said scan lines and/or said signal lines at each end of said set of lines so as to sandwich an insulating film therebetween, and a lead-out line that is connected to one end of said spare line, wherein said lead-out lines are connected to external connecting lines, which are outside of said display electrode board, so that said lead-out lines can be connected to each other through said connecting lines (see FIGS. 1 and 3).

Another matrix-type display device of this invention comprises a display electrode board that has a plurality of pixel electrodes arranged into a matrix and a set of scan lines extending in parallel in a direction and a set of signal lines extending in an orthogonal relation with said scan lines so that these lines are arranged between the adjacent pixel electrodes, a spare line that intersects at least some of said scan lines and/or said signal lines at each end of said set of lines so as to sandwich an insulating film therebetween, and a lead-out line that is connected to each end of said spare line, wherein said lead-out lines are connected to external connecting lines, which are outside of said display electrode board, so that said lead-out lines that extend toward the direction of said scan lines or said signal lines to which said spare lines are connected can be connected to each other through said connecting lines (see FIGS. 4A and 5).

Another matrix-type display device of this invention comprises a display electrode board that has a plurality of pixel electrodes arranged into a matrix and a set of scan lines extending in parallel in a direction and a set of signal lines extending in an orthogonal relation with said scan lines so that these lines are arranged between the adjacent pixel electrodes, a plurality of spare lines that intersect at least some of said scan lines and/or said signal lines at each end of said set of lines so as to sandwich an insulating film therebetween, and a lead-out line that is connected to each end of each spare line, wherein said lead-out lines are connected to external connecting lines, which are outside of said display electrode board, so that said lead-out lines that extend toward the direction of said scan lines or said signal lines to which said spare lines are connected can be connected to each other through said connecting lines (see FIGS. 6A and 7).

Another matrix-type display device of this invention comprises a display electrode board that has a plurality of pixel electrodes arranged into a matrix and a set of scan lines extending in parallel in a direction and a set of signal lines extending in an orthogonal relation with said scan lines so that these lines are arranged between the adjacent pixel electrodes, a set of spare lines that intersect at least some of said scan lines and/or said signal lines at each end of said set of lines so as to sandwich an insulating film therebetween, and a lead-out line that is connected to each end of said set of spare lines scan lines and/or said signal lines, wherein said lead-out lines are connected to external connecting lines, which are outside of said display electrode board, so that said lead-out lines that extend toward the direction of said scan lines or said signal lines to which said spare lines are connected can be connected to each other through said connecting lines (see FIGS. 8A and 9).

Another matrix-type display device of this invention comprises a display electrode board that has a plurality of pixel electrodes arranged into a matrix and a set of scan lines extending in parallel in a direction and a set of signal lines extending in an orthogonal relation with said scan lines so that these lines are arranged between the adjacent pixel electrodes, a set of spare lines that intersect at least some of said scan lines and/or said signal lines at each end of said set of lines so as to sandwich an insulating film therebetween, and a plurality of lead-out lines that intersect said set of spare lines so as to sandwich an insulating film therebetween, wherein each of the plurality of spare lines, which intersect said scan lines and/or said signal lines at one end thereof, and the corresponding spare line, which intersects said scan lines and/or said signal lines at the other end thereof, are arranged so that they can be connected to each other through an external connecting line that is outside said display electrode board (see FIG. 10).

Another matrix-type display device of this invention comprises a plurality of pixel electrodes that are arranged into a matrix, a set of scan lines extending in parallel in a direction and a set of signal lines extending in an orthogonal relation with said scan lines so that these lines are arranged between the adjacent pixel electrodes, a first pair of spare lines that intersect at least some of said scan lines and/or said signal lines at both ends of said set of lines so as to sandwich at least insulating films therebetween, and a second pair of spare lines that extend in parallel to said scan lines or said signal lines which intersect said first pair of spare lines, each of said second pair of spare lines connecting the corresponding end of one of said first pair of spare lines with the corresponding end of the other spare line (see FIG. 11A).

In one embodiment, the second pair of spare lines intersect said signal lines or said scan lines, which do not intersect said first pair of spare lines, so as to sandwich at least two insulating films therebetween (see FIG. 13A).

Another matrix-type display device of this invention comprises a plurality of pixel electrodes that are arranged into a matrix, a set of scan lines extending in parallel in a direction and a set of signal lines extending in an orthogonal relation with said scan lines so that these lines are arranged between the adjacent pixel electrodes, a first pair of spare lines that intersect at least some of said scan lines and/or said signal lines at both ends of said set of lines so as to sandwich at least insulating films, and a second pair of spare lines that extend in parallel to said scan lines or said signal lines which intersect said first pair of spare lines, each of said second pair of spare lines intersecting the corresponding ends of said first pair of spare line in a non-conducting state (see FIG. 12A).

Another matrix-type display device of this invention comprises a plurality of pixel electrodes that are arranged into a matrix, a set of scan lines extending in parallel in a direction and a set of signal lines extending in an orthogonal relation with said scan lines so that these lines are arranged between the adjacent pixel electrodes, a pair of spare lines that intersect at least some of said scan lines and/or said signal lines at both ends of said set of lines so as to sandwich at least insulating films therebetween, and a lead-out line that is connected to one end of each of said pair of spare lines, wherein said lead-out lines are connected to external connecting lines, which are outside of said display electrode board, so that said lead-out lines can be connected to each other through said connecting lines (see FIG. 14A).

Thus, the invention described herein makes possible the objectives of (1) providing a matrix-type display device which has a function to correct a line breakdown spot and in which the correction of the breakdown spot entails little or no increase in load capacity, electrical resistance, and noise with respect to the corrected line; (2) providing a matrix-type display device which permits correction of two or more bus-line breakdown spots; (3) providing a matrix-type display device which permits correction of more than two bus line breakdown spots with fewer limitations according to the location of any such breakdown spot; and (4) providing a matrix-type display device which is less liable to the occurrence of isolation defects between the bus lines and the spare lines.

BRIEF DESCRIPTION OF THE DRAWINGS

This invention may be better understood and its numerous objects and advantages will become apparent to those skilled in the art by reference to the accompanying drawings as follows.

DESCRIPTION OF THE PREFERRED EMBODIMENTS

Example 1

Figure 1:
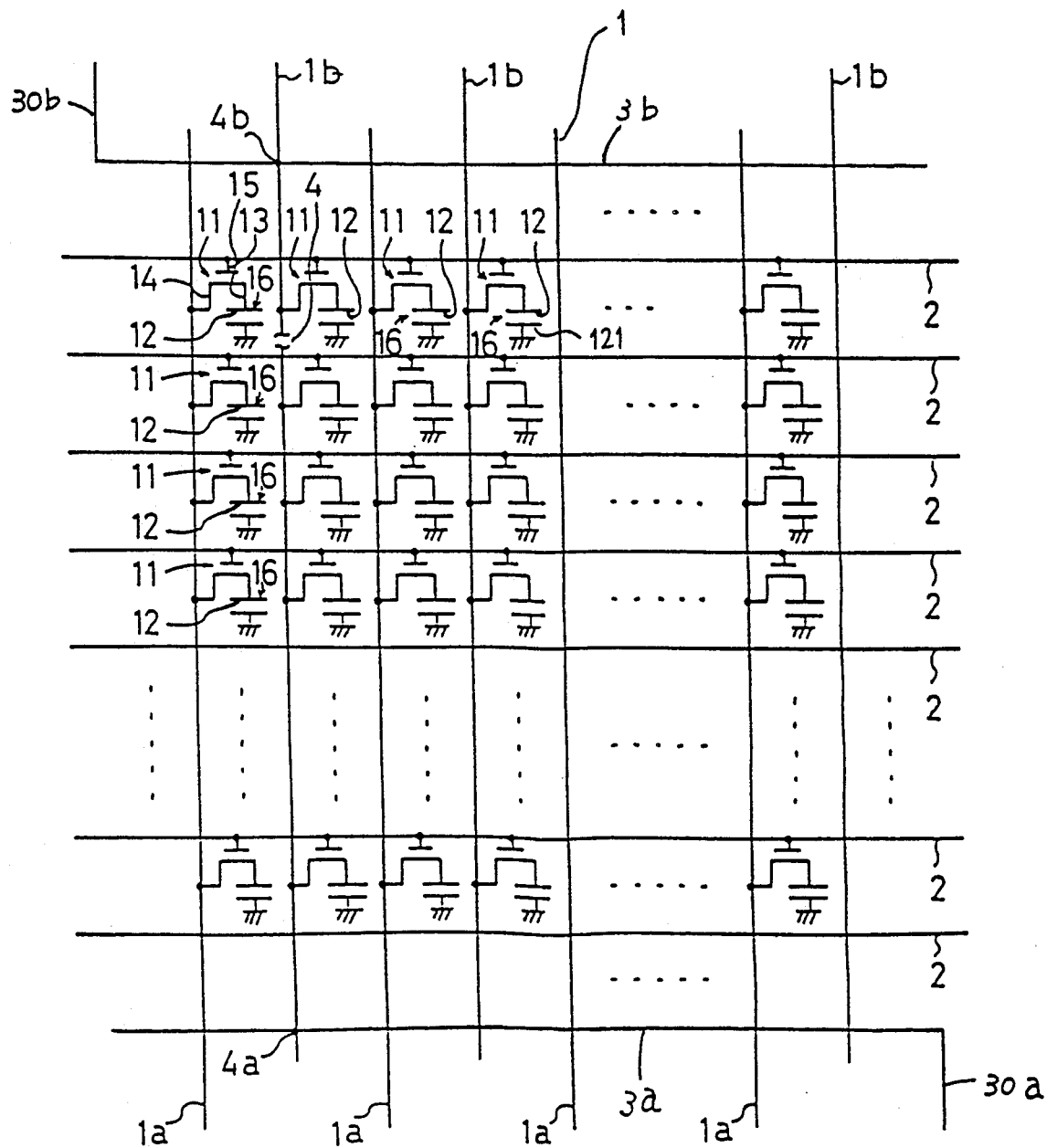
FIG. 1 is a circuit diagram of a display electrode board used in a matrix-type display device of this invention.

FIG. 1 shows the circuit diagram of a display electrode board employed in a matrix-type display device of this invention. The display electrode board has a large number of gate bus lines 2 extending in parallel in a direction, and a large number of source bus lines 1 extending in orthogonal relation with the gate bus lines 2. The source bus lines 1 comprise two sets of source bus lines 1a and 1b, the source bus lines 1a and 1b being individually connected to different driver ICs. The gate bus lines 2 and the source bus lines 1 function respectively as scan lines and signal lines. Each gate bus line 2 and each source bus line 1 intersects each other so as to sandwich an insulation film therebetween in a non-conducting state. Spare lines 3a and 3b intersect each source bus line 1 at opposite ends thereof so as to sandwich an insulation film therebetween. Lead-out lines 30a and 30b are connected respectively to the spare lines 3a and 3b at the ends thereof. The lead-out lines 30a and 30b are connected, without intersecting the gate bus lines 2, to external connecting lines.

Each rectangular area defined by adjacent gate bus lines 2 and adjacent source bus lines 1 has a pixel electrode 12. A liquid crystal sealed between the pixel electrode 12 and the counter electrode 121 to form a liquid crystal cell 16. A TFT 11, as a switching element, is connected to each pixel electrode 12. The TFT 11 has a gate electrode 13 and a source electrode 14 which are respectively connected to the gate bus line 2 and the source bus line 1. A drain electrode 15 of the TFT 11 is connected to the pixel electrode 12.

Figure 2:
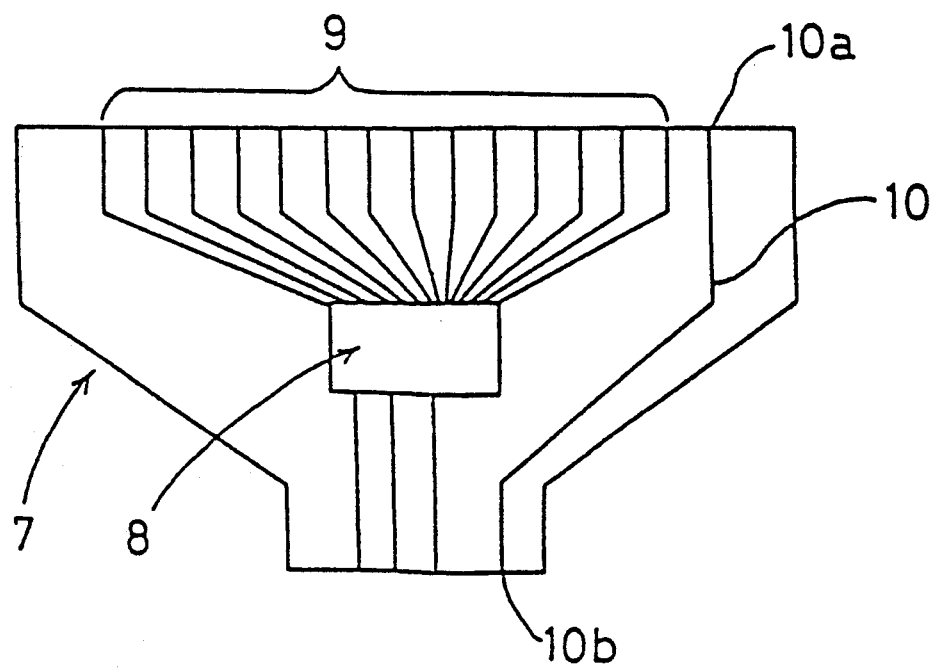
FIG. 2 is a plan view showing a driven film connected to the board of FIG. 1.

FIG. 2 is a plan view showing a driver film connected to a display electrode board having the circuit illustrated in FIG. 1. On the driver film 7 there is provided a driver IC 8 from which extend source bus connecting lines 9 connected to the source bus lines 1a. A line 10 that is disposed on a film (hereinafter, referred to as an on-film line) is provided along the source bus connecting lines 9. One end 10a of the on-film line 10 is connected to the lead-out line 30a (FIG. 1) on the display electrode board. The other end 10b of the on-film line 10 is connected to a connecting line (not shown) conducted onto a circuit board (not shown). Therefore, the lead-out line 30a on the display electrode board is conducted outward from the display electrode board by the connecting line.

Another set of source bus lines 1b and the lead-out line 30b on the display electrode board in FIG. 1 are connected to another driver film similar to the one shown in FIG. 2, and the on-film line to which the lead-out line 30b is connected is connected in turn to a connecting line conducted onto the circuit board. Therefore, the lead-out line 30b on the display electrode board is also conducted outward from the display electrode board by the connecting line. On the circuit board, the two connecting lines connected through the on-film lines to two spare lines 3a and 3b are so arranged that they can be connected to each other later.

The manner of correcting any breakdown caused to the source bus lines 1 on the display device of the present embodiment will be explained below. Assuming that a line breakdown has occurred on one source bus line 1b at spot 4 as shown in FIG. 1, the defective source bus line 1b and the spare line 3a are electrically connected to each other at point 4a at which one end of the defective source bus line 1b intersects the spare line 3a. Likewise, the defective source bus line 1b and the spare line 3b are electrically connected to each other at point 4b at which the other end of the defective source bus line 1b intersects the spare line 3b. Further, on the circuit board, the two connecting lines connected to the spare lines 3a and 3b are electrically connected to each other. Through such an electrical connection made at three points, portions of the source bus line 1b on both sides of the breakdown spot 4 are electrically connected via the connecting lines outside of the board.

Figure 15A:
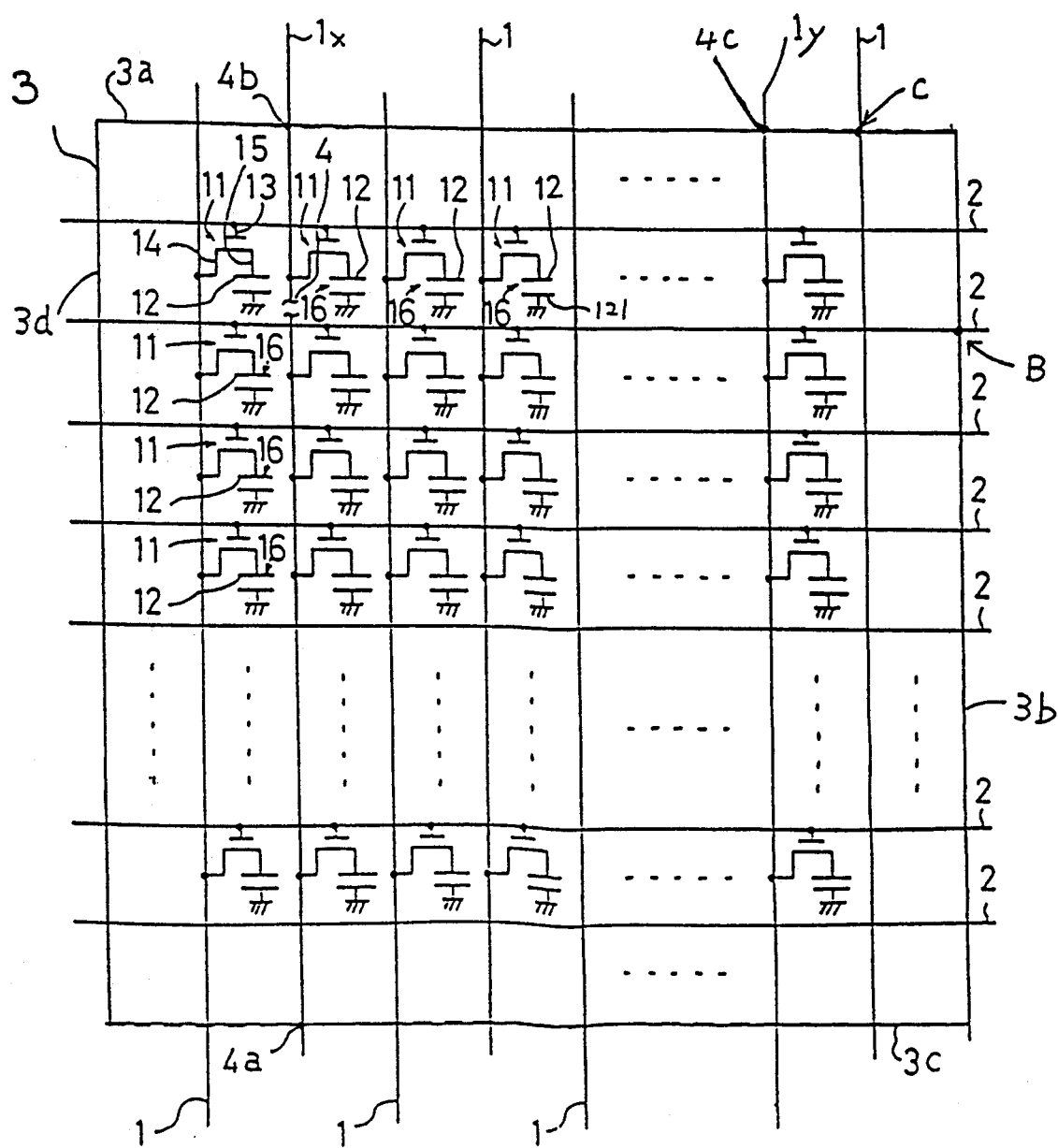
FIG. 15A is a circuit diagram of a display electrode board used in a conventional matrix-type display device.
Figure 15:
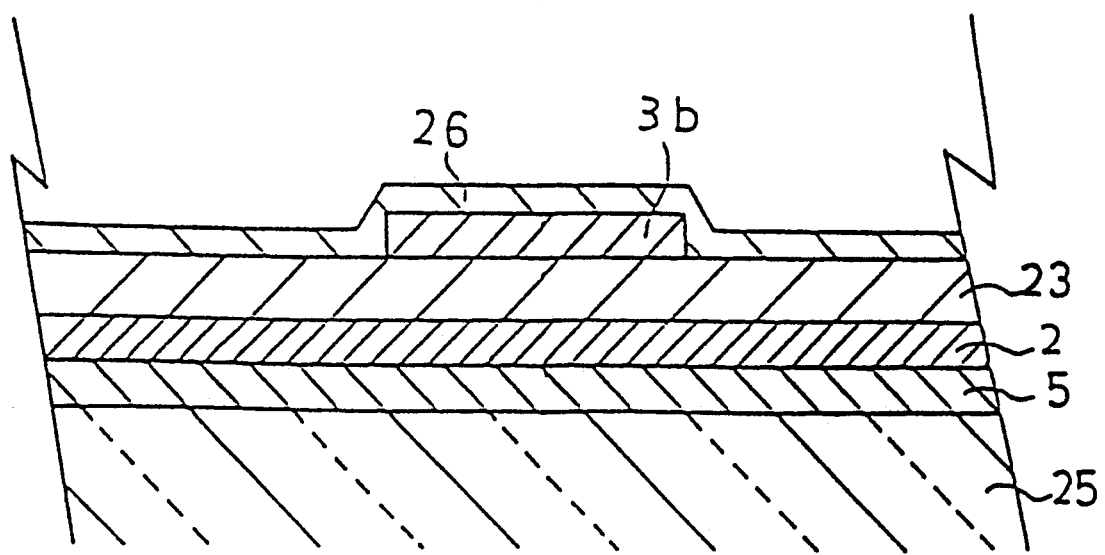
FIG. 15B is a sectional view taken along a gate bus line at point B in FIG. 15A.
FIG. 15C is sectional view taken along a source bus line at point C in FIG. 15A.
Figure 15:
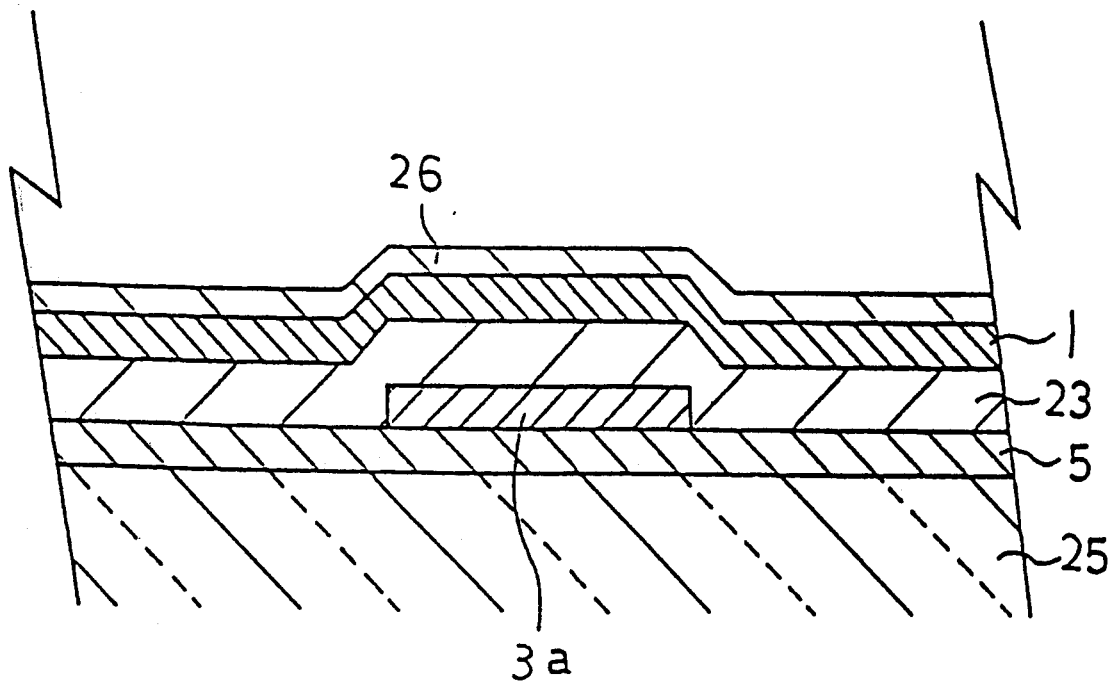

The source bus line thus corrected for its breakdown defect is not liable to any such excessive increase in its total load capacity and electrical resistance as has been seen with the display electrode board shown in FIG. 15A. Therefore, the correction will never entail the problem of capacity deficiency of the driver IC 8 or the problem of signal delay. Further, with the display device of the present embodiment, it is possible to reduce the number of bus lines intersecting spare lines, thereby reducing noise from the intersecting bus lines.

Example 2

Figure 3:
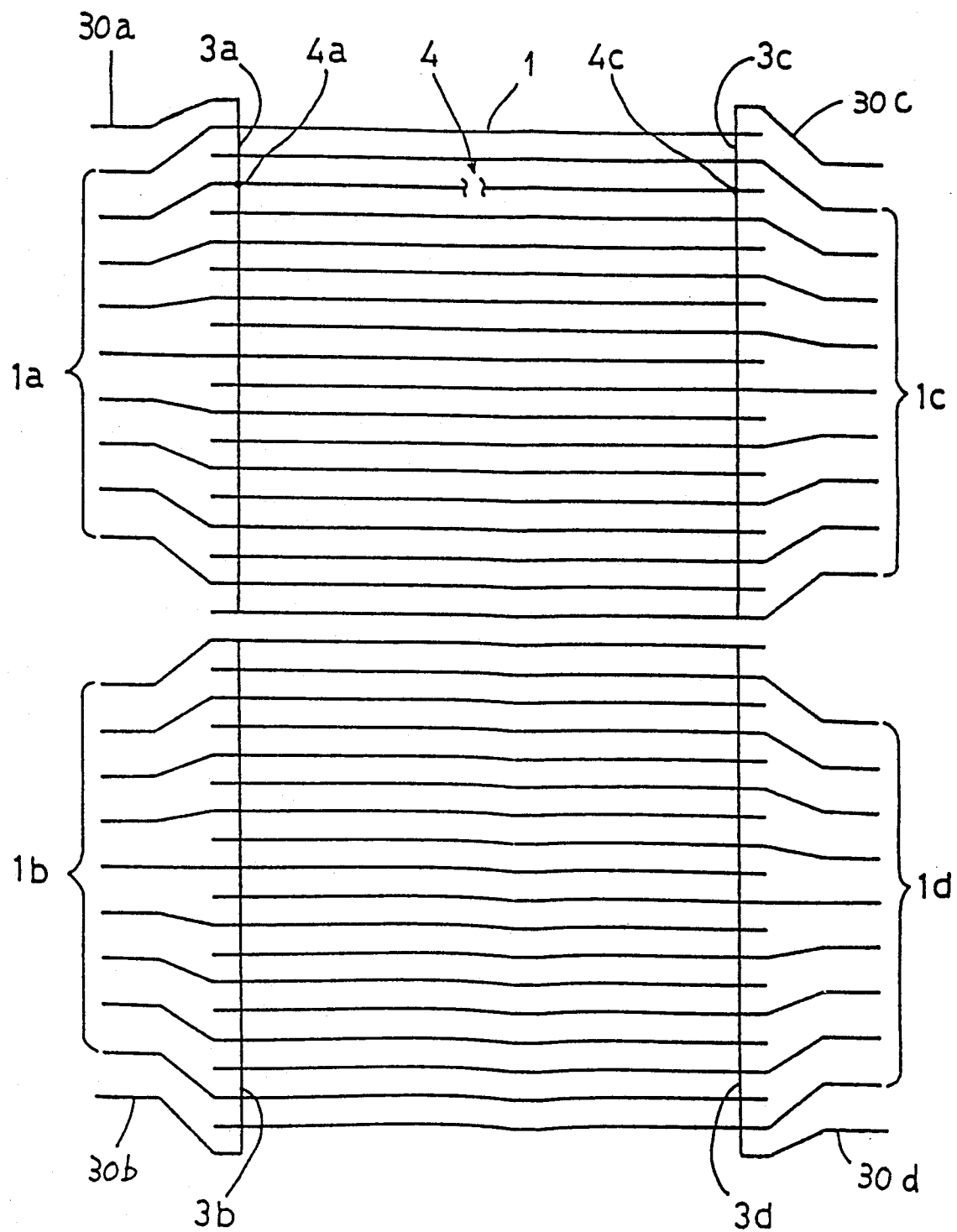
FIG. 3 is a circuit diagram of source bus lines and spare lines disposed on another display electrode board used in a display device of this invention.

FIG. 3 shows a circuit diagram for another embodiment of the invention. In FIG. 3, gate bus lines, TFTs, pixel electrodes, etc., are omitted for the sake of simplicity, and only source bus lines and spare lines are shown. In this embodiment, the source bus lines 1 are divided into four sets of source bus lines 1a, 1b, 1c, and 1d. The source bus lines 1a, 1b, 1c, and 1d are individually connected to different driver ICs.

Spare lines 3a and 3c intersect the source bus lines 1a and 1c at both ends thereof so as to sandwich an insulating film therebetween. Similarly, spare lines 3b and 3d intersect the source bus lines 1b and 1d at both ends thereof so as to sandwich an insulating film therebetween. Lead-out lines 30a–30d are connected respectively to the spare lines 3a–3d. The source bus lines 1a and the lead-out line 30a are connected respectively to source bus connecting lines and an on-film line on such a driver film as shown in FIG. 2, the on-film line being connected to a connecting line conducted onto a circuit board. Likewise, the source bus lines 1c and the lead-out line 30c are connected respectively to source bus connecting lines and an on-film line on the driver film, the on-film line being connected to a connecting line conducted onto the circuit board. The connecting lines conducted onto the circuit board are arranged so that they can later be connected to a connecting line connected to the spare line 3a through the on-film line. Similarly, the lead-out lines 30b and 30d are connected to connecting lines interconnectably arranged on the circuit board.

In this example, when a line breakdown 4 is present on one source bus line 1a, the defective source bus line 1a on which the breakdown 4 is present and two spare lines 3a and 3c are connected at both ends of the defective source bus line 1a. That is, the defective source bus line 1a and the spare line 3a are electrically connected to each other at an intersecting point 4a, and the defective source bus line 1a and the spare line 3c are electrically connected to each other at an intersecting point 4c. Further, on the circuit board, the two connecting lines connected to the spare lines 3a and 3c are electrically connected to each other. Through such an electrical connection effected at three points, portions of the source bus line 1a on both sides of the breakdown spot 4 are electrically connected by means of the spare lines 3a and 3c and of the connecting lines outside of the display electrode board.

In the foregoing Examples 1 and 2, description is made only of the arrangement for correcting a breakdown caused to any of the source bus lines 1 according to the invention. According to the invention, however, it is possible to arrange for correcting any breakdown caused to the gate bus lines 2. In order to provide an arrangement for correcting a breakdown on any gate bus line 2, the spare lines are arranged so that they intersect the gate bus lines so as to sandwich an insulating film therebetween. Further, the display device of the invention can be of such arrangement that it has a function to correct a line breakdown with respect to the source bus lines 1 and also a function to correct a line breakdown with respect to gate bus lines 2.

The matrix type display devices of Examples 1 and 2 have a function to correct a breakdown on any bus line and provide an advantage that the correction of such line breakdown entails little or no increase in the load capacity and electrical resistance of and noise from the corrected line. According to the arrangement shown in each of the foregoing examples, therefore, it is possible to accurately correct possible defects of picture elements, enhance the yield of display devices, and reduce the production cost of display device.

Example 3

In the embodiments described in the foregoing Examples 1 and 2, line breakdowns at two locations cannot be corrected. If two source bus lines 1 on which the breakdowns have occurred and the spare lines 3a and 3b are connected, a signal input to one of the two bus lines is also input to the other source bus line, and therefore these source bus line cannot perform their proper functions.

Figure 4:
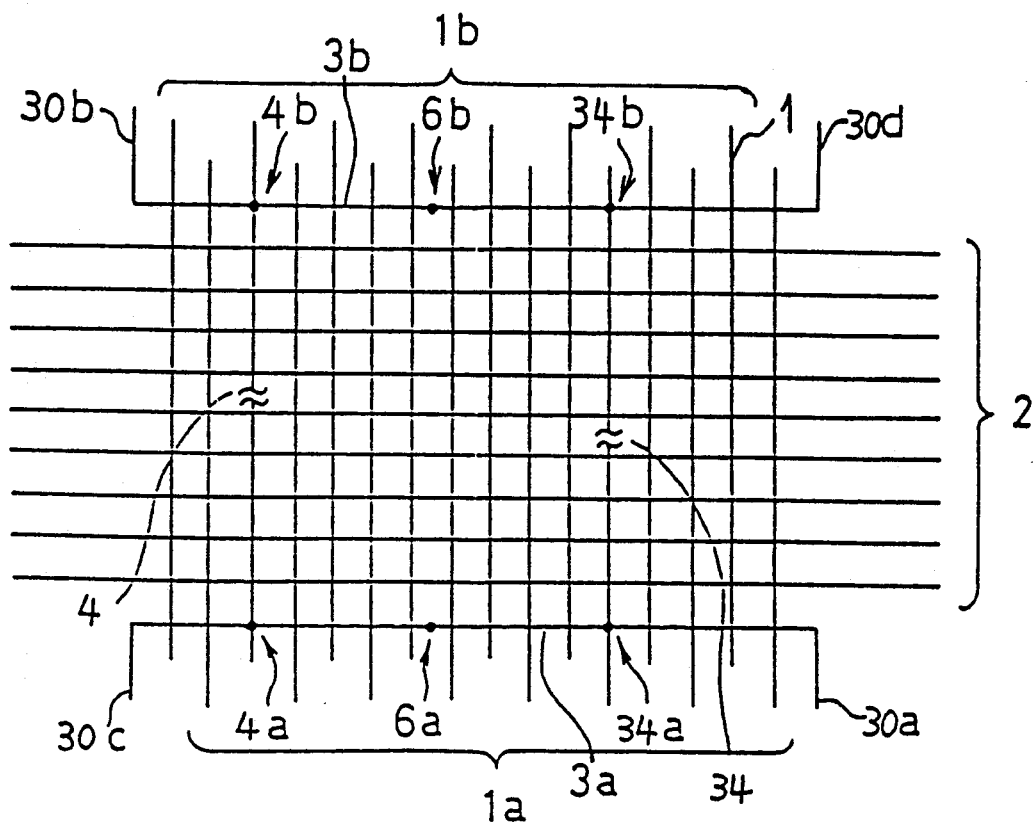
FIG. 4A is a plan views showing another display electrode board used in a display device of this invention.
FIG. 4B is a plan view showing a driver film connected to the board of FIG. 4A.
Figure 4:
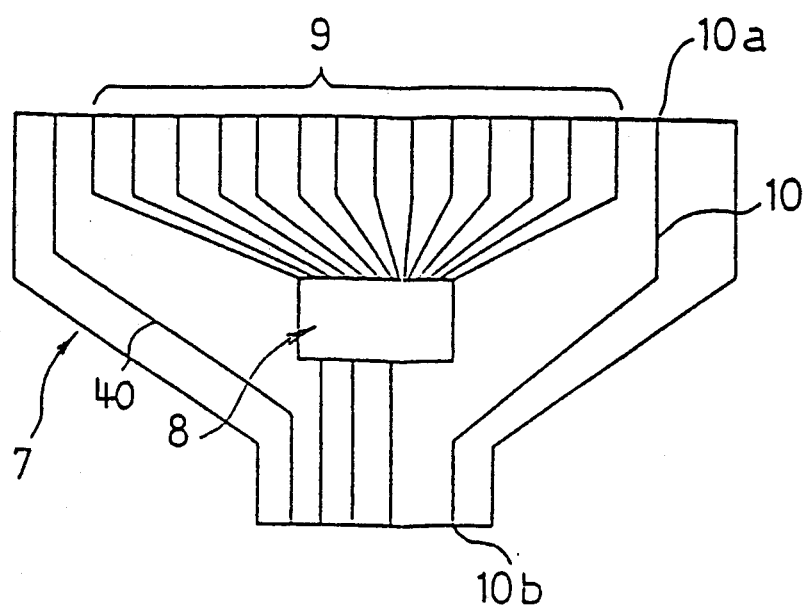

FIG. 4A is a plan view showing a display electrode board in which line breakdowns caused at two locations can be corrected. FIG. 4B is a plan view of a driver film connected to the board. In the board shown in FIG. 4A, a lead-out line 30c, in addition to the lead-out line 30a, is connected to the spare line 3a. The lead-out line 30c is also connected to a connecting line conducted onto the circuit board through an on-film line 40. Similarly, a lead-out line 30d, in addition to the lead-out line 30b, is connected to the spare line 3b, the lead-out line 30d being also connected to a connecting line conducted onto the circuit board through an on-film line. The connecting line connected to the lead-out line 30a and the connecting line connected to the lead-out line 30d are inter connectably arranged on the circuit board, the lead-out lines 30a and 30d being opposed to each other in the longitudinal directions of the source bus lines 1. Similarly, the connecting line connected to the lead-out line 30b and the connecting line connected to the lead-out line 30c are inter-connectably arranged, the lead-out lines 30b and 30c being opposed to each other in the longitudinal directions of the source bus lines 1.

In the board shown in FIG. 4A, one line breakdown 4 is first corrected in same manner as is described with the board of FIG. 1, and then another breakdown 34 can be corrected. The correction of the line breakdown 34 is effected in the following way. The defective source bus line 1a is connected to the spare lines 3a and 3b at intersecting points 34a and 34b, in the same manner as in the case of correcting the breakdown 4. Next, the spare line 3a is severed at a point, e.g., 6a, between the intersecting points 4a and 34a on the spare line 3a. Likewise, the spare line 3b is severed at point 6b between the intersecting points 4b and 34b on the spare line 3b. Again, on the circuit board, the connecting line connected to the lead-out line 30a and the connecting line connected to the lead-out line 30d are connected to each other. Similarly, the connecting line connected to the lead-out line 30b and the connecting line connected to the lead-out line 30c are connected to each other. In this way, line breakdowns at two locations can be corrected.

Example 4

Figure 5:
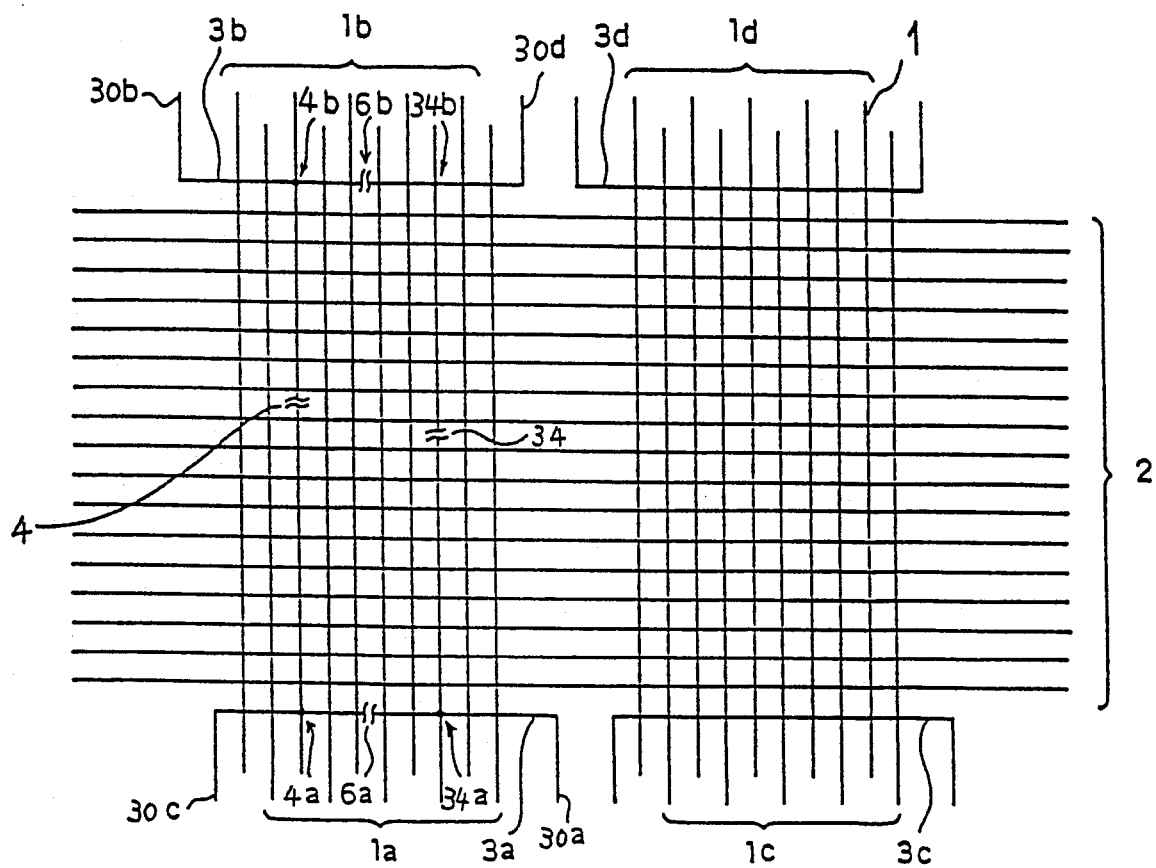
FIG. 5 is a schematic plan view showing a board of such an arrangement that line breakdowns at plural locations can be connected.

FIG. 5 shows a board of such an arrangement that line breakdowns at more than two locations can be corrected. In the board, the source bus lines 1 are divided into two blocks. One of the blocks consists of source bus lines 1a and 1b, the other block consists of source bus lines 1c and 1d. The source bus lines 1a, 1b, 1c, and 1d are individually connected to driver ICs on different driver films. Spare lines 3a and 3b intersect the source bus lines 1a and 1b of the one block at opposite ends so as to sandwich an insulating film therebetween. Likewise, spare lines 3c and 3d intersect the source bus lines 1c and 1d of the other block at opposite ends so as to sandwich an insulating film therebetween.

Lead-out lines 30a and 30c are connected to the spare line 3a, and they are further connected to a connecting line conducted onto the circuit board through an on-film line. Likewise, lead-out lines 30b and 30d are connected to the spare line 3b, and they are further connected to a connecting line conducted onto the circuit board through an on-film line. The connecting line connected to the lead-out line 30a and the connecting line connected to the lead-out line 30d are interconnectably arranged on the circuit board. Likewise, the connecting line connected to the lead-out line 30b and the connecting line connected to the lead-out line 30c are interconnectably arranged. Similarly, in the other block, the spare lines 3c and 3d are arranged to be interconnectable at both ends by means of connecting lines conducted through on-film lines onto the circuit board.

According to the board arrangement shown in FIG. 5, it is possible to correct two more breakdowns which have occurred within the same block. Correction of breakdown spots 4 and 34 can be effected in the same manner as in the foregoing Example 3. According to this board arrangement, two line breakdowns can be corrected for each block. A maximal number of line breakdowns correctable is 4 for the board as a whole.

Example 5

Figure 6:
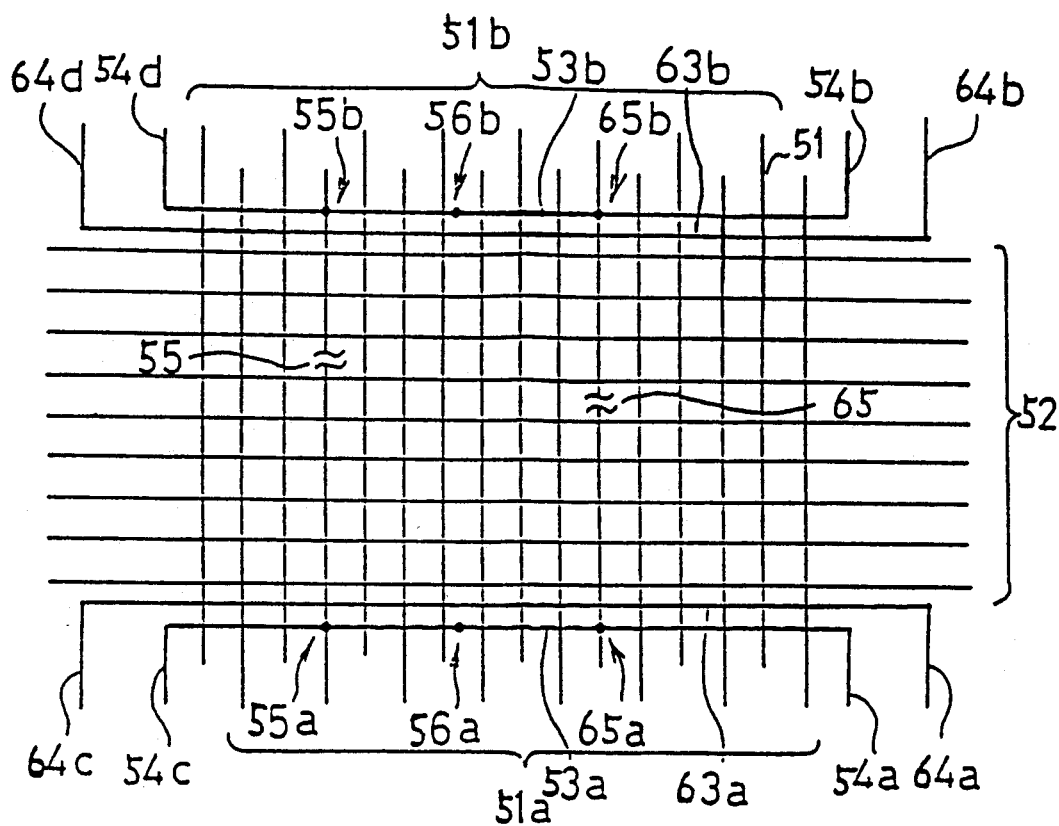
FIG. 6A is a schematic plan view showing still another display electrode board used in a matrix-type display device of this invention.
FIG. 6B is a plan view showing a driver film connected to the board of FIG. 6A.
FIG. 6C is a schematic diagram showing a process for the correction of line breakdowns.
Figure 6:
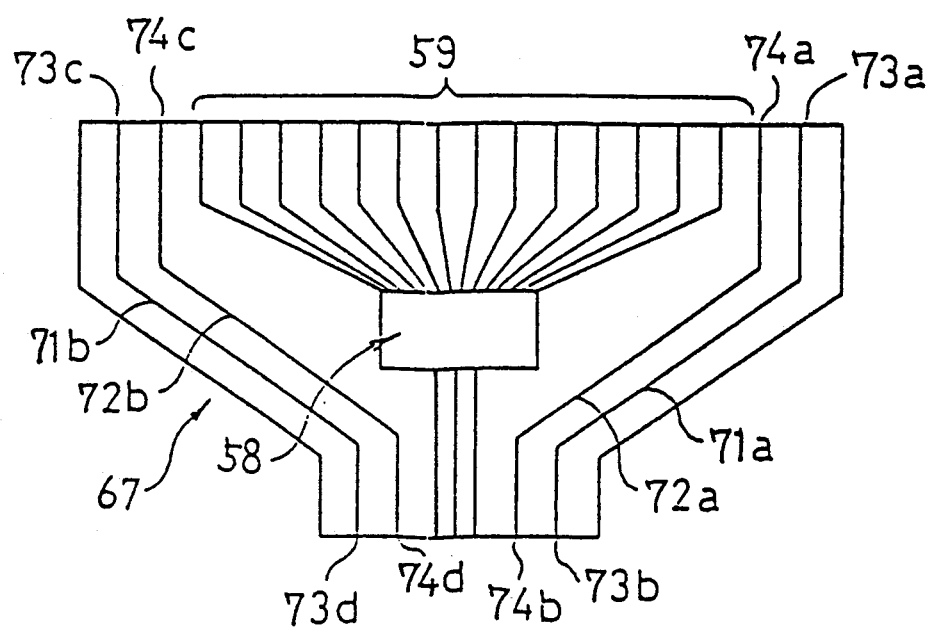

FIG. 6A shows another display electrode board in which line breakdowns present at more than three locations can be corrected. In this example, source bus lines 51 consist of two sets of source bus lines 51a and 51b which are connected to different driver ICs. Gate bus lines 52 intersect the source bus lines 51 in a non-conducting state so as to sandwich an insulating film therebetween.

Spare lines 53a, 53b and spare lines 63a, 63b intersect the source bus lines 51 at opposite ends thereof so as to sandwich an insulating film therebetween. Lead-out lines 54a, 54c and lead-out lines 64a, 64b are connected to the spare lines 53a, 53b at respective opposite ends thereof. The lead-out lines 54a, 54c, 64a, and 64b are individually connected to connecting lines outside of the board, without intersecting the gate bus lines 52. Likewise, lead-out lines 54b, 54d and lead-out lines 64b, 64d are connected to the spare lines 63a, 63b. The lead-out lines 54b, 54d, 64b, and 64d are individually connected to connecting lines outside of the board, without intersecting the gate bus lines 52.

FIG. 6B is a plan view showing a driver film connected to the board shown in FIG. 6A. On the driver film 67 there is provided a driver IC 58, from which source bus connecting lines 59 extend for being connected to the source bus lines 51a. On-film lines 71a, 72a, 71b, and 72b are arranged in parallel to the source bus connecting lines 59. The on-film lines 71a, 72a, 71b, and 72b are connected at their respective one ends 73a, 74a, 73c, and 74c to the lead-out lines 64a, 54a, 64c, and 54c (FIG. 6A) on the display electrode board. The other ends 73b, 74b, 73d, and 74d of the on-film lines 71a, 72a, 71b, and 72b are connected to connecting lines (not shown) conducted onto the circuit board (not shown).

Another set of source bus lines 51b, and spare lines 53b and 63b on the display electrode board in FIG. 6A are connected to another driver film of same configuration as the one shown in FIG. 6B. The lead-out lines 54b and 54d connected to the spare lines 53b and 63b, and the on-film lines to which the lead-out lines 64b and 64d are connected are again connected to corresponding connecting lines conducted onto the above mentioned circuit board.

The four connecting lines connected through on-film lines to the four lead-out lines 54a, 54c, 54b, and 54d are interconnectably arranged on the circuit board. That is, the connecting line connected to the lead-out line 54a and the connecting line connected to the lead-out line 54b are interconnectably placed on the circuit board, the lead-out lines 54a and 54b being oriented opposite to each other in the longitudinal direction of the source bus lines 1. Likewise, the connecting line connected to the lead-out line 54c and the connecting line connected to the lead-out line 54d are interconnectably placed on the circuit board, the lead-out lines 54c and 54d being oriented opposite to each other in the longitudinal direction of the source bus lines 1.

Similarly, four connecting lines connected to the lead-out lines 64a, 64c, 64b, and 64d, which are connected to two spare lines 63a and 63b, are also so arranged that they can be interconnected later. That is, the connecting line connected to the lead-out line 64a and the connecting line connected to the lead-out line 64b are interconnectably placed on the circuit board, the lead-out lines 64a and 64b being oriented opposite to each other in the longitudinal direction of the source bus lines 1. Likewise, the connecting line connected to the lead-out line 64c and the connecting line connected to the lead-out line 64d are interconnectably placed on the circuit board, the lead-out lines 64c and 64d being oriented opposite to each other in the longitudinal direction of the source bus lines 1.

In the board shown in FIG. 6A, when two line breakdowns 55 and 65 have occurred respectively on source bus lines 51a and 51b, the breakdowns can be corrected by using the spare lines 53a and 53b. The one defective source bus line 51a on which the breakdown 55 is present is first connected to the spare lines 53a and 53b at intersecting points 55a and 55b. Again, the other defective source bus line 51b on which the breakdown 65 is present is connected to the spare lines 53a and 53b at intersecting points 65a and 65b.

Next, the spare line 53a is severed at a point, e.g., 56a, between the intersecting points 55a and 65a on the spare line 53a. Likewise, the spare line 53b is severed at a point, e.g., 56b, between the intersecting points 55b and 65b on the spare line 53b. Further, on the circuit board, the connecting line connected to the lead-out line 54a and the connecting line connected to the lead-out line 54b are connected to each other. Likewise, the connecting line connected to the lead-out line 54c and the connecting line connected to the lead-out line 54d are connected to each other. In this way, two line breakdowns 55 and 65 are corrected.

According to the arrangement of this embodiment, it is possible to correct line breakdowns by using spare lines 63a and 63b only, instead of spare lines 53a and 53b only. It is also possible to correct line breakdowns by using all the spare lines 53a and 53b, 63a, and 63b. That is, the breakdown 55 is corrected by using the spare lines 53a and 53b, for example, and the breakdown 65 is corrected by using the spare lines 63a and 63b. In this case, the above mentioned step of severing the spare lines 53a and 53b at points 56a and 56b is unnecessary.

Figure 6C:
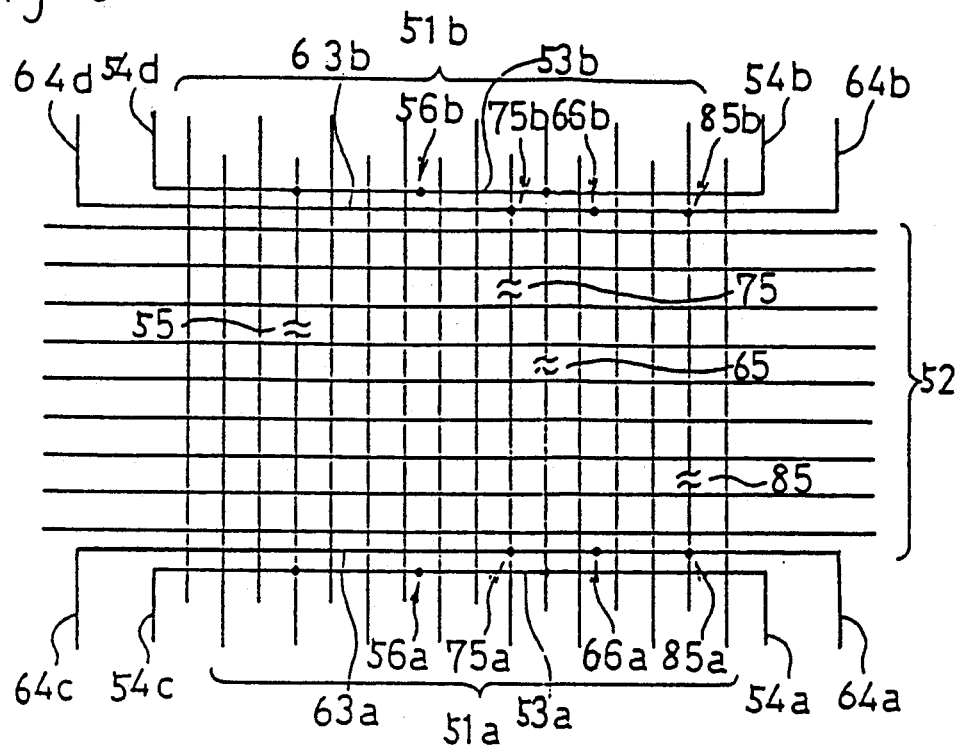

According to the arrangement of this embodiment, it is also possible to correct, in addition to the two breakdowns 55 and 65, two other breakdowns 75 and 85 (FIG. 6C), on source bus lines 51. The manner of correcting these four breakdowns is illustrated in FIG. 6C. After breakdowns 55 and 65 are corrected by using the spare lines 53a and 53b in the same manner as in FIG. 6A, breakdowns 75 and 85 are corrected by using spare lines 63a and 63b. That is, the defective source bus line 51a on which the breakdown 75 is present is connected to spare lines 63a and 63b at intersecting points 75a and 75b. Moreover, the defective source bus line 51b on which the breakdown 85 is present is connected to spare lines 63a and 63b at intersecting points 85a and 85b.

Next, the spare line 63a is severed at a point, e.g., 66a, between the intersecting points 75a and 85a on the spare line 63a. Likewise, the spare line 63b is severed at a point, e.g., 66b, between the intersecting points 75b and 85b on the spare line 63b. Moreover, on the above-mentioned circuit board, the connecting line connected to the lead-out line 64a, and the connecting line connected to the lead-out line 64b are connected to each other. Similarly, the connecting line connected to the lead-out line 64c, and the connecting line connected to the lead-out line 64d are connected to each other. In this way, four breakdowns 55, 65, 75, and 85 are corrected.

Example 6

Figure 7:
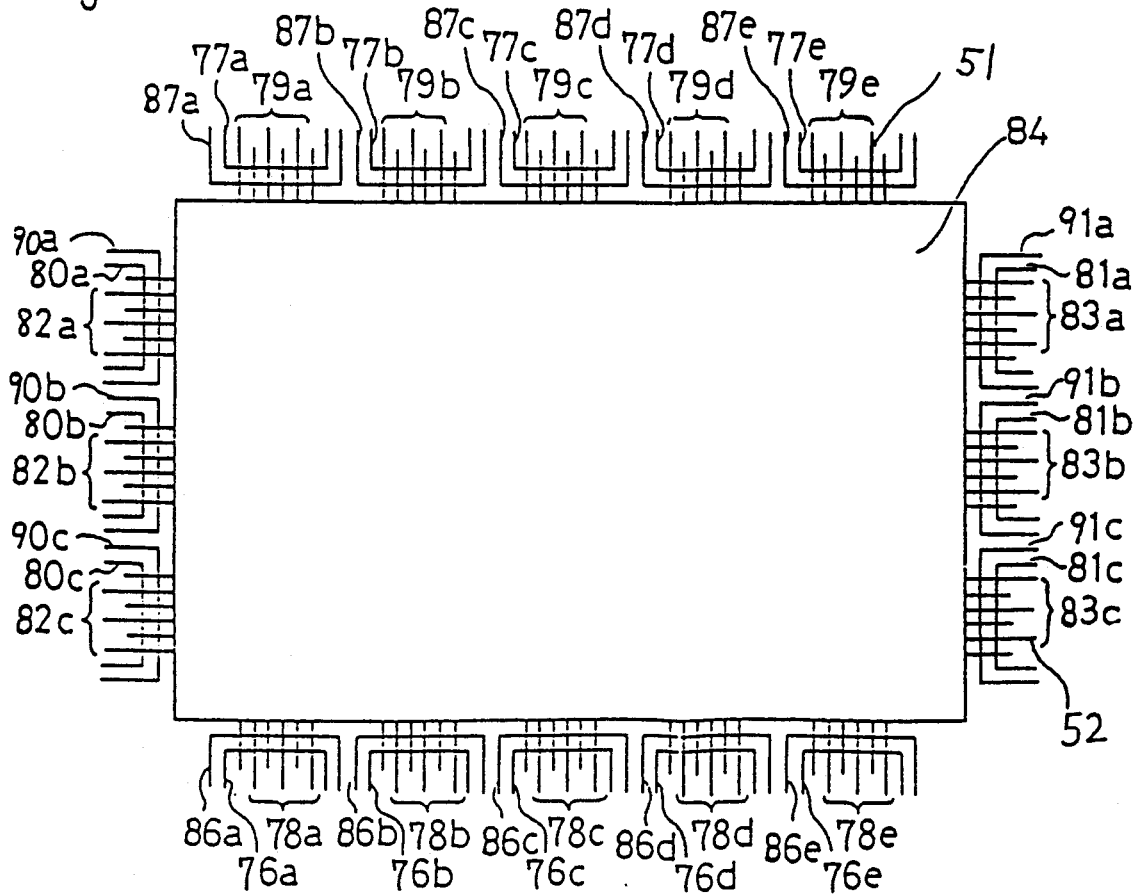
FIG. 7 is a plan view showing another display device of this invention.

FIG. 7 is a plan view showing another embodiment of the invention.

In this embodiment, source bus lines 51 and gate bus lines 52 arranged vertically and horizontally on a display screen 84 are led to the external. The source bus lines 51 consist of source bus lines 78a-78e and 79a-79e, and the gate bus lines 52 consist of gate bus lines 82a-82c and 83a-83c. Source spare lines 76a and 86a intersect the source bus lines 78a and 79a at one end thereof so as to sandwich an insulating film therebetween. Likewise, source spare lines 77a and 87a intersect the source bus lines 78a and 79a at the other end thereof so as to sandwich an insulating film therebetween. There are also provided source spare lines 76b-76e, 86b-86e, 77b-77e, and 87b-87e which intersect the other source bus lines 78b-78e and 79b-79e in the similar manner.

Further, in this example, the display device has another function for correcting line breakdowns caused to any gate bus line. Gate spare lines 80a and 90a intersect the gate bus lines 82a and 83a at one end thereof so as to sandwich an insulating film therebetween. Likewise, gate spare lines 81a and 91a intersect the gate bus lines 82a and 83a at the other end thereof so as to sandwich an insulating film therebetween. There are also provided gate spare lines 80b-80c, 90b-90c, 81b-81c, and 91b-91c which intersect the other gate bus lines 82b-82c and 83b-83c in a similar manner.

According to the arrangement of this embodiment, it is possible to correct four breakdowns caused to, for example, source bus lines 78a and 79a which constitute one partition, by using source spare lines 76a, 77a, 86a, and 87a. According to the arrangement, therefore, it is possible to correct breakdowns at 20 locations on different source bus lines 51 in the display device as a whole. Similarly, it is possible to correct four breakdowns caused to, for example, gate bus lines 82a and 83a which constitute one partition, by using gate spare lines 80a, 81a, 90a, and 91a. According to the arrangement, therefore, it is possible to correct breakdowns at 12 locations on different gate bus lines 52 in the display device as a whole.

In the present example, the source bus lines 51 are divided into five partitions, and the gate bus lines 52 are divided into three partitions. It is noted that by increasing the number of partitions it is possible to correct a greater number of breakdowns. Also, in the present example, there are provided two sets (four lines) of spare lines for each partition of bus lines. It is noted that by increasing the number of spare lines it is possible to correct a greater number of breakdowns.

In the matrix type display device exemplified above, a large number of breakdown spots can be corrected; therefore, even when the display device becomes larger in size and is further sophiscated, there will be no yield drop with the display device. Therefore, the arrangement of this embodiment contributes to cost reduction in the production of display devices.

Example 7

Figure 8:
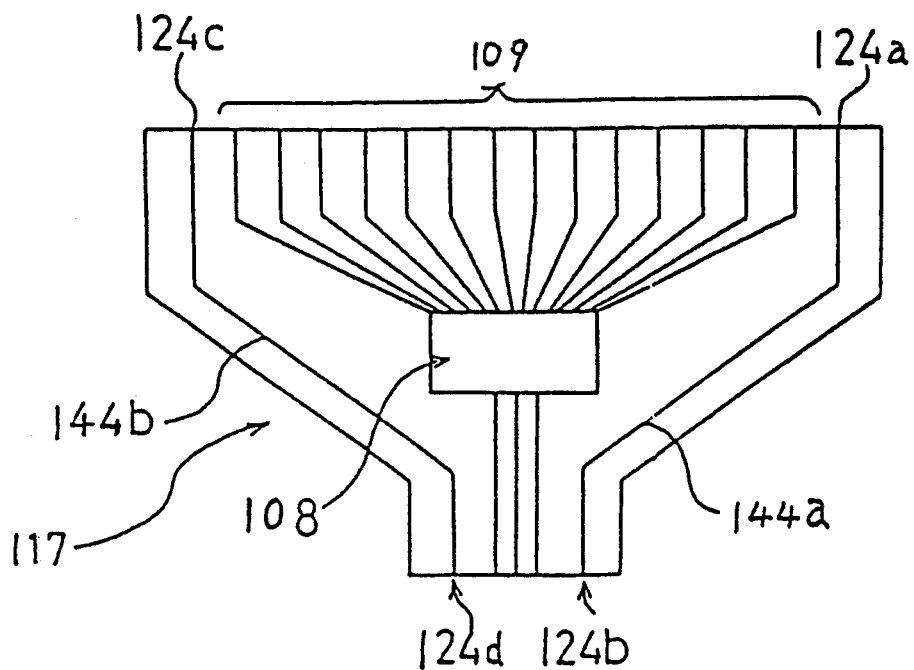
FIG. 8A is a plan view showing still another display electrode board used in a matrix-type display device of this invention.
FIG. 8B is a plan view showing a driver film connected to the board of FIG. 8A.
FIG. 8C is a plan view showing the board of FIG. 8A in which line breakdowns have been connected.

FIG. 8A is a plan view showing a display electrode board used in the matrix type display device according to the invention. A large number of source bus lines 101 are arranged in parallel in orthogonal relation to a large number of gate bus lines 102 extending in parallel in a direction. The source bus lines 101 consist of two sets of source bus lines 101a and 101b, which are individually connected to different driver ICs. The gate bus lines 102 and the source bus lines 101 intersect each other in a non-conducting state so as to sandwich an insulating film therebetween.

Spare lines 103a, 113a, and spare lines 103b, 113b, respectively, intersect the source bus lines 101 at opposite ends thereof so as to sandwich an insulating film therebetween. The spare lines 103a, 113a, 103b, and 113b are arranged in parallel relation to the gate bus lines 102. Lead-out lines 104a and 104c are electrically connected to the spare lines 103a and 113a at respective opposite ends thereof. The lead-out lines 104a and 104c are individually connected to connecting lines outside of the display electrode board. Similarly, lead-out lines 104b and 104d are electrically connected to the spare lines 103b and 113b at respective opposite ends thereof. The lead-out lines 104b and 104d are individually connected to connecting lines outside of the display electrode board.

FIG. 8B is a plan view showing a driver film connected to the board shown in FIG. 8A. A driver IC 108 is provided on a driver film 117, and source bus connecting lines 109 extend from the driver IC 108, the source bus connecting lines 109 being connected to source bus lines 101a (FIG. 8A). Lead-out lines 144a and 144b are provided in parallel relation to the source bus connecting lines 109. Respective singular ends 124a and 124c of the lead-out lines 144a and 144b on the film are connected respectively to lead-out lines 104a and 104c (FIG. 8A) on the display electrode board. Respective other ends 124b and 124d of the lead-out lines 144a and 144b are individually connected to lines conducted onto a circuit board (not shown).

Another set of source bus lines 101b, and lead-out lines 104b, 104d on the display electrode board in FIG. 8A are connected to another driver film of the same configuration as the one shown in FIG. 8B. The lead-out lines 104b and 104d are conducted onto the circuit board through lead-out lines on the driver film.

On the circuit board, the connecting line connected to the lead-out line 104a and the connecting line connected to the lead-out line 104b are so arranged that they can be connected to each other later, the lead-out lines 104a and 104b being opposed to each other in the longitudinal direction of the source bus lines 101. Similarly, the connecting line connected to the lead-out line 104c and the connecting line connected to the lead-out line 104d are so arranged on the circuit board that they can be connected to each other later, the lead-out lines 104c and 104d being opposed to each other in the longitudinal direction of the source bus lines 101.

In the display electrode board shown in FIG. 8A, when two breakdowns 105 and 115 have occurred on source bus lines 101a and 101b respectively, the breakdown defects can be corrected by using spare lines 103a, 103b and lead-out lines 104a-104d. First, in the same manner as in the case of the board shown in FIG. 4A, the defective source bus line 101a on which breakdown 105 is present is connected to the spare lines 103a and 113b at intersecting points 105a and 105b. Likewise, the defective source bus line 101b on which breakdown 115 is present is connected to the spare lines 103a and 103b at intersecting points 115a and 115b.

Then, the spare lines 103a and 113a are respectively severed at a point, e.g., 106a, between the intersecting points 105a and 115a on the spare line 103a and at a point, e.g., 126a on the spare line 113a. Likewise, the spare lines 103b and 113b are respectively severed at a point 106b between the intersecting points 105b and 115b on the spare line 103b and at a point, e.g., 126b on the spare line 113b. Moreover, on the above mentioned circuit board, a line connected to the lead-out line 104a, which in turn is connected to respective singular ends of the spare lines 103a and 113a, and a line connected to the lead-out line 104b, which in turn is connected to respective one ends of the spare lines 103b and 113b, are connected to each other. Likewise, a line connected to the lead-out line 104c, which in turn is connected to the respective other ends of the spare lines 103a and 113a, and a line connected to the lead-out line 104d, which in turn is connected to the respective other ends of the spare lines 103b and 113b, are connected to each other on the circuit board. In this way, two breakdown spots 105 and 115 are corrected.

In the present example, as described above, line breakdowns are corrected by using spare lines 103a and 103b only, but it is also possible to correct breakdowns by using spare lines 113a and 113b only.

It may be noted that after the above-described steps of connecting the defective source bus line 101a to the spare lines 103a and 103b and connecting the defective source bus line 101b to the spare lines 103a and 103b are carried out, electrical connection may not take place between the so connected parts, or even though electrical connection does take place, high resistance may be present. In such a case, the defective bus lines can be corrected by further using the spare lines 113a and 113b.

FIG. 8C illustrates the FIG. 8A display electrode board that was corrected by further using the spare lines 113a and 113b. In the display electrode board shown in FIG. 8C, the defective source bus line 101a is connected to the spare lines 103a and 103b and the defective source bus line 101b is likewise connected to the spare lines 103a and 103b, as already shown in FIG. 8A. Moreover, in the board shown in FIG. 8C, the defective bus line 101a is connected to the spare lines 113a and 113b at intersecting points 125a and 125b. Likewise, the defective source bus line 101b is connected to the spare lines 113a and 113b at intersecting points 135a and 135b.

The lead-out lines 104a and 104b, as well as the lead-out lines 104c and 104d, are electrically connected to each other on the circuit board as already stated; therefore, opposite ends of the defective source bus line 101a on which the breakdown defect 105 is present are electrically connected to each other by the spare lines 103a, 113a, lead-out lines 104c, 104d, and spare lines 103b, 113b. Likewise, opposite ends of the defective source bus line 101b on which the breakdown defect 115 is present are electrically connected to each other by the spare lines 103a, 113a, lead-out lines 104a, 104b, and spare lines 103b, 113b. In this way, by using two spare lines each at opposite ends of each defective bus line, two breakdown spots can be accurately corrected.

Example 8

Figure 9:
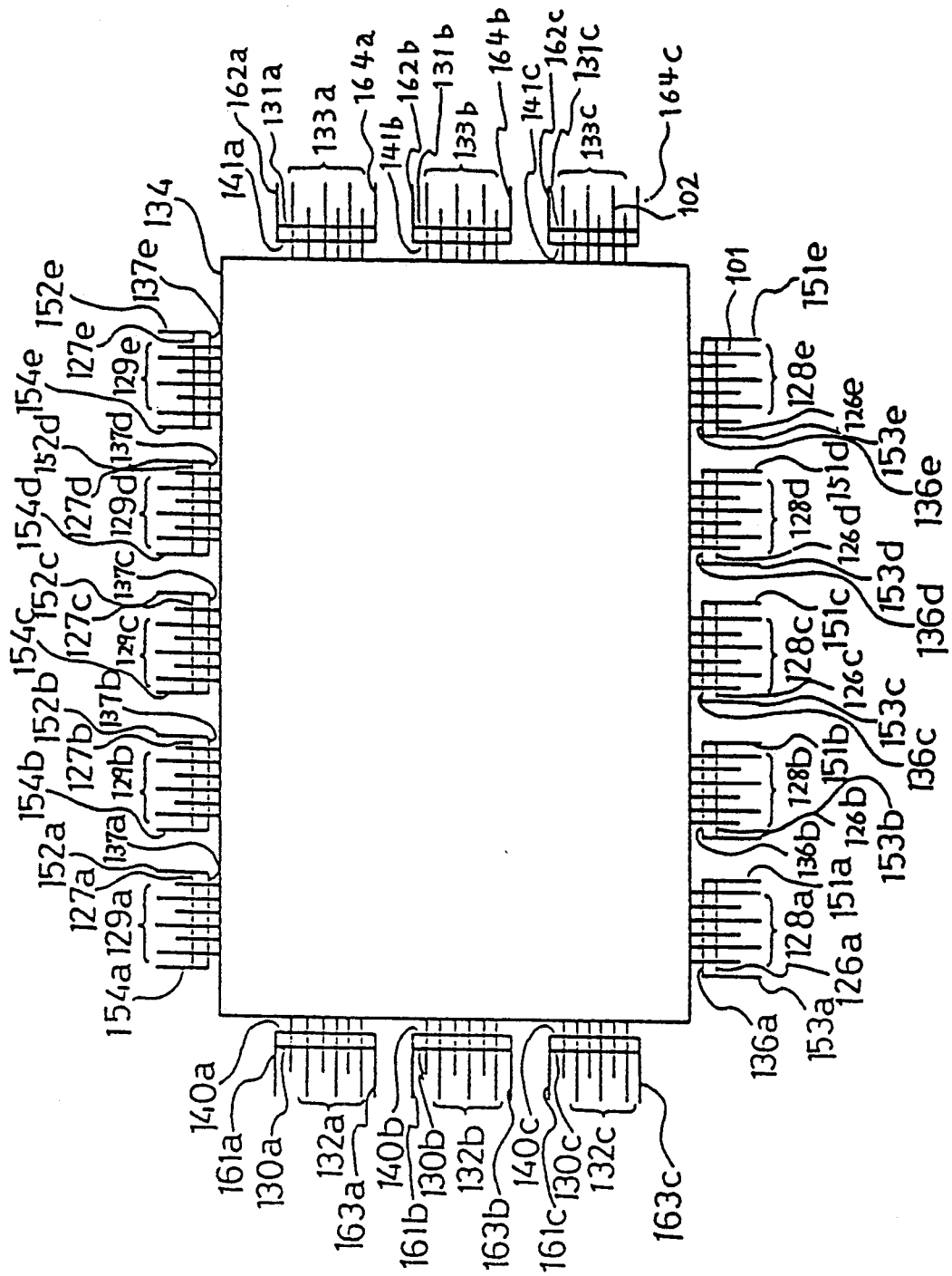
FIG. 9 is a plan view showing another display device of this invention.

FIG. 9 is a plan view showing another embodiment of the invention. In this embodiment, source bus lines 101 and gate bus lines 102 arranged vertically and horizontally on a display screen 134 are led to the outside of the board. The source bus lines 101 consist of source bus lines 128a-128e and 129a-129e. The gate bus lines 102 consist of gate bus lines 132a-132c and 133a-133c. Source spare lines 126a and 136a intersect the source bus lines 128a and 129a at one end thereof so as to sandwich an insulating film therebetween. Lead-out lines 151a and 153a are electrically connected to the source bus lines 126a and 136a at opposite ends thereof. Likewise, source spare lines 127a and 137a intersect the source bus lines 128a and 129a at the other end thereof so as to sandwich an insulating film therebetween. Lead-out lines 152a and 154a are electrically connected to the source spare lines 127a and 137a at opposite ends thereof. For other source bus lines 128b-128e and 129b-129e as well, there are provided source spare lines 126b-126e, 136b-136e, 127b-127e, and 137b-137e in a similar intersecting relation. Lead-out lines 151b-151e, 152b-152e, 153b-153e, and 154b-154e are electrically connected to these spare lines at opposite ends thereof.

The display electrode board of the present embodiment has an additional function to correct breakdown defects caused to gate bus lines. Gate spare lines 130a and 140a intersect the gate bus lines 132a and 133a at respective one ends thereof so as to sandwich an insulating film therebetween. Lead-out lines 161a and 163a are electrically connected to the gate spare lines 130a and 140a at opposite ends thereof. Gate spare lines 131a and 141a intersect the gate bus lines 132a and 133a at the respective other ends thereof so as to sandwich an insulating film therebetween. Lead-out lines 162a and 164a are electrically connected to the gate spare lines at opposite ends thereof. For other gate bus lines 132b, 133b and 132c, 133c as well, there are provided gate spare lines 130b, 140b; 131b, 141b; 130c, 140c; 131c, 141c in a similar intersecting relation. Lead-out lines 161b-164b, 161c-164c are electrically connected to these spare lines at opposite ends thereof.

According to the arrangement of the present embodiment, it is possible to correct two breakdown defects caused to, for example, source bus lines 128a and 129a which constitute one partition, by utilizing source spare lines 126a, 136a, 127a, and 137a, and also lead-out lines 151a-154a. According to the arrangement, therefore, it is possible to correct ten breakdowns caused to different source bus lines 101 in the display device as a whole. Similarly, it is possible to correct two breakdown defects caused to, for example, gate bus lines 132a and 133a which constitute one partition, by utilizing gate spare lines 130a, 140a, 131a, and 141a, and also lead-out lines 161a-164a. According to the arrangement of the present embodiment, it is possible to correct six breakdowns caused to different gate bus lines 102 in the display device as a whole. In this example, it is possible to achieve more accurate correction of any defective bus line by using two spare lines at opposite ends of the defective bus line.

In the present example, the source bus lines 101 are divided into five partitions, and the gate bus lines 102 are divided into three partitions, but it is noted that by increasing the number of partitions, it is possible to correct many more line breakdowns. In the example, two spare lines are provided at opposite ends of each partition. It is noted in this connection as well that by increasing the number of spare lines, it is possible to achieve more accurate correction of breakdown defects.

Example 9

Figure 10:
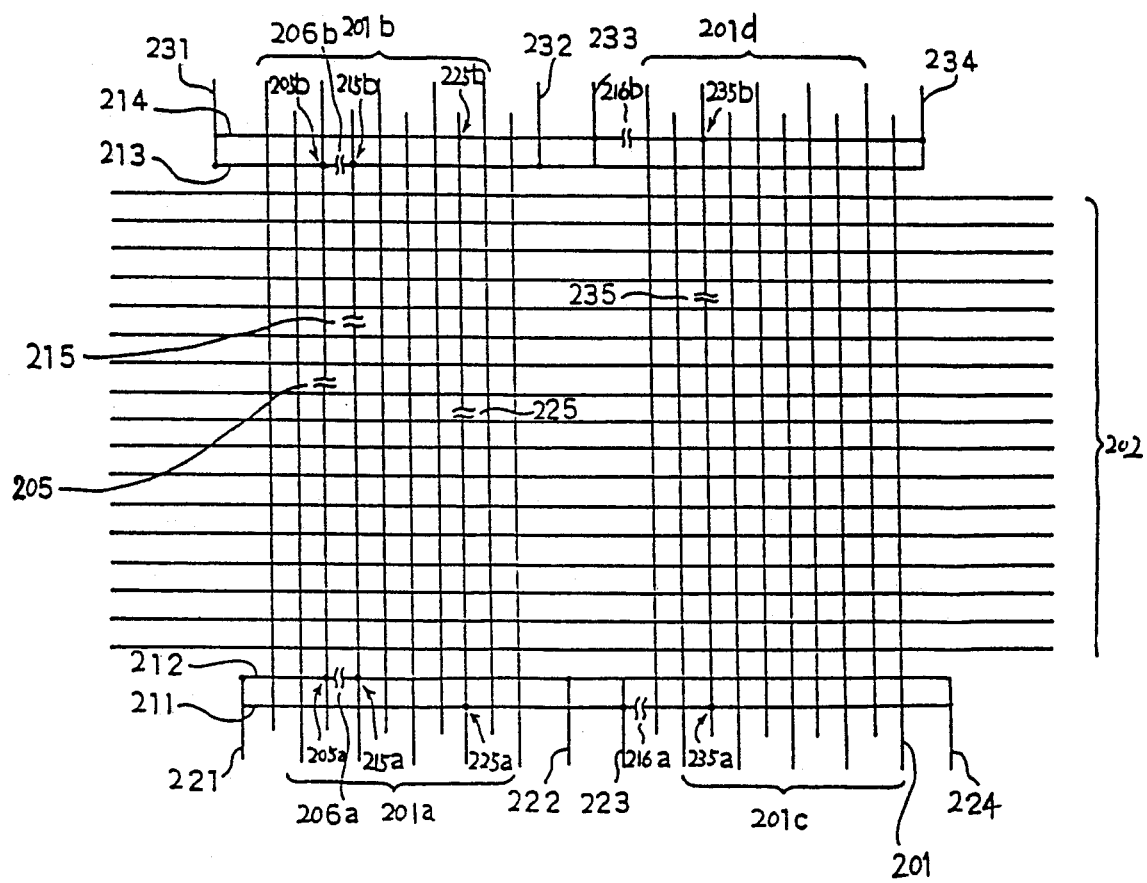
FIG. 10 is a plan view showing still another display electrode board used in a matrix-type display device of this invention.

FIG. 10 is a schematic plan view showing another display electrode board used in the matrix type display device of the present invention. On an insulating film placed over a number of gate bus lines 202 extending in parallel, a number of parallel source bus lines 201 are arranged in an intersecting relation to the gate bus lines 202. In the present example, the source bus lines 201 are divided into two blocks. One of the blocks consists of source bus lines 201a and 201b, and the other block consists of source bus lines 201c and 201d. The source bus lines 201a–201d are individually conducted onto different driver films and are connected to different driver ICs. Below the respective one end portions of the source bus lines 201 there extend spare lines 211 and 212 in an intersecting relation therewith so as to sandwich the above mentioned insulating film therebetween. Likewise, below the respective other end portions of the source bus lines 201 there extend spare lines 213 and 214 in an intersecting relation so as to sandwich the insulating film therebetween.

These spare lines 211, 212, 213, and 214 are arranged in a parallel relation to the gate bus lines 202, so that they are formed simultaneously with the gate bus lines 202. Lead-out lines 221, 222, 223, and 224 are arranged above the spare lines 211 and 212 in an intersecting relation therewith so as to sandwich the above mentioned insulating film therebetween. Likewise, lead-out lines 231, 232, 233, and 234 are arranged above the spare lines 213 and 214 in an intersecting relation therewith so as to sandwich the above mentioned insulating film therebetween. Lead-out lines 221–224, and lead-out lines 231–234 are formed simultaneously with the source bus lines 201. In the present embodiment, lead-out lines 221–224 are not connected to spare lines 211 and 212. Likewise, lead-out lines 231–234 are not connected to spare lines 213 and 214.

In individual rectangular areas defined by gate bus lines 202 and source bus lines 201 there are provided pixel electrodes and TFTs which function as switching elements in FIG. 10, but these parts are omitted for the sake of clarity. Liquid crystals are sealed between the board and a counter electrode board equipped with a counter electrode to form a matrix type liquid crystal display device.

The lead-out lines 221, 222 and the source bus lines 201a are conducted onto one driver film (not shown), and the lead-out lines 221, 222 are connected to connecting lines conducted onto the circuit board. Similarly, the lead-out lines 231, 232 and the source bus lines 201b are conducted onto one driver film (not shown), and the lead-out lines 231, 232 are connected to connecting lines conducted onto the circuit board. The connecting lines connected to the lead-out lines 221, 222 are so arranged on the circuit board that they can be connected to the connecting lines which are connected to the lead-out lines 231 and 232, the lead-out lines 221, 222 being opposed to the lead-out lines 231 and 232 in the longitudinal direction of the source bus lines 201.

Similarly, the lead-out lines 223, 224 and the lead-out lines 233, 234 are conducted onto the circuit board through a driver film (not shown) to which the source bus lines 201c and 201d are connected. The connecting lines connected to the lead-out lines 223, 224 are so arranged that they can be connected to the connecting lines which are connected to the lead-out lines 233 and 234, the lead-out lines 223, 224 being opposed to the lead-out lines 233 and 234 in the longitudinal direction of the source bus lines 201.

Assume that a breakdown defect has occurred on one of the source bus lines 201 during the use of the display device of the present embodiment. The manner of correcting the device will be explained by way of an example. When a breakdown 205 is present on one of the source bus lines 201b as shown in FIG. 10, the defective source bus line 201b and the spare line 212 are connected to each other at intersecting point 205a by the application of a laser beam or the like. Likewise, the defective source bus line 201b and the spare line 213 are connected at intersecting point 205b. Then, the spare line 212 and the lead-out line 221 are connected by the application of a laser beam. Likewise, the spare line 213 and the lead-out line 231 are connected. Then, on the aforesaid circuit board, the two connecting lines connected to the lead-out lines 221 and 231 are electrically connected. By effecting electrical connection at five sites in this way, portions of the defective source bus line 201b on both sides of the breakdown spot 205 are electrically connected through the connecting lines on the circuit board.

According to the arrangement of this embodiment, a total of up to 3 breakdown defects in each block can be corrected. For example, assume that three breakdown defects have occurred in the block of source bus lines 201a and 201b. Where breakdown defects 215 and 225 have occurred in addition to the breakdown 205, as shown in FIG. 10, breakdown 205 is first corrected in such a manner as above mentioned. Similarly, the defective source bus line 201a on which breakdown 215 is present and the spare line 212 are connected at intersecting point 215a by the application of a laser beam. Likewise, the defective source bus line 201a and the spare line 213 are connected at intersecting point 215b. After the spare lines 212 and 213 are connected respectively to the lead-out lines 222 and 232 by the application of a laser beam, the two connecting lines connected to the lead-out lines 222, 232 are electrically connected on the above mentioned circuit board. Then, the spare lines 212 and 213 are severed at points 206a and 206b respectively by a laser beam application.

Next, the defective source bus line 201a on which breakdown 225 is present and the spare line 211 are connected at intersecting point 225a. Likewise, the defective source bus line 201a and the spare line 214 are connected at intersecting point 225b. Then, spare lines 211 and 214 are connected respectively to lead-out lines 223 and 233 by a laser beam application. Then, the two connecting lines connected to the lead-out lines 223 and 233 are connected on the above mentioned circuit board.

As described above, portions of the defective source bus line 201b on both sides of the breakdown spot 205 are electrically connected by means of the spare line 212, lead-out line 221, lead-out line 231, and spare line 213. Likewise, portions of the defective source bus line 201a on both sides of the breakdown spot 215 are electrically connected by means of the spare line 212, lead-out line 222, lead-out line 232, and spare line 213. Then, portions of the defective source bus line 201a on both sides of the breakdown spot 225 are electrically connected by means of the spare line 211, lead-out line 223, lead-out line 233, and spare line 214.

According to the arrangement of the present embodiment, it is possible to correct, in addition to the above mentioned three breakdowns, one more breakdown defect which may occur in the block of source bus lines 201c and 201d. By way of an example, it is assumed that a breakdown defect 235 has occurred on source bus line 201d. First, the defective source bus line 201d is connected to the spare lines 211 and 214 at intersecting points 235a and 235b respectively by a laser beam application. Next, the spare lines 211 and 214 are connected respectively to the lead-out lines 224 and 234 by a laser beam application. The two connecting lines connected to the lead-out lines 224 and 234 are electrically connected to each other on the circuit board. Then, the spare lines 211 and 214 are severed at points 216a and 216b respectively by a laser beam application. In this way, portions of the defective source bus line 201d on both sides of the defective spot 235 are electrically connected by means of the spare line 211, lead-out line 224, lead-out line 234, and spare line 214.

According to the arrangement of the present embodiment, it is possible to correct three breakdown spots in the one block. After correction of three breakdown defects have been effected in the one block, however, it is possible to correct one breakdown spot only in the other block. Considering this point, it may appear that this embodiment provides no great advantage. When the matter of productivity in actual production scene is considered, correction of three bus lines for each display apparatus may be taken as a limit. Therefore, it is more advantageous to reduce limitations attributable to the location of any possible breakdown than making it possible to correct many defective bus lines.

In the present example, by providing one more spare line at each end of the source bus lines 201 it is possible to correct four breakdown spots for each block. Even if the number of spare lines is increased in this way, the maximum number of defects that can be corrected is limited to the number of pairs of lead-out lines, which means that four is maximum in the present instance. This maximum number may be increased by increasing the number of pairs of lead-out lines.

Although in the present example, a matrix type display device having a function to correct source bus line defects has been described, it is possible to provide an arrangement so that the device can have a function to correct gate bus line defects. It is also possible to arrange that the device can have a function to correct both source bus line defects and gate line defects.

In this example, a manner of correcting source bus line defects has been described. According to the invention, however, it is also possible to correct leak defects between the source bus lines and the gate bus lines. When such a leak defect has occurred, the affected bus lines are severed at opposite ends of the leak spot, and the severed site is corrected in the same manner as in this example.

With the matrix type display device of this embodiment, it is possible to correct a plurality of breakdown defects, with less limitation by reason of the location of such breakdown defects. According to the invention, therefore, it is possible to obtain an improved display device yield and thus contribute toward cost reduction in the production of display devices.

In the foregoing Examples 1 to 9, active matrix type display devices only are described; however, it is understood that the invention is applicable to other types of display devices as well.

Example 10

Figure 11A:
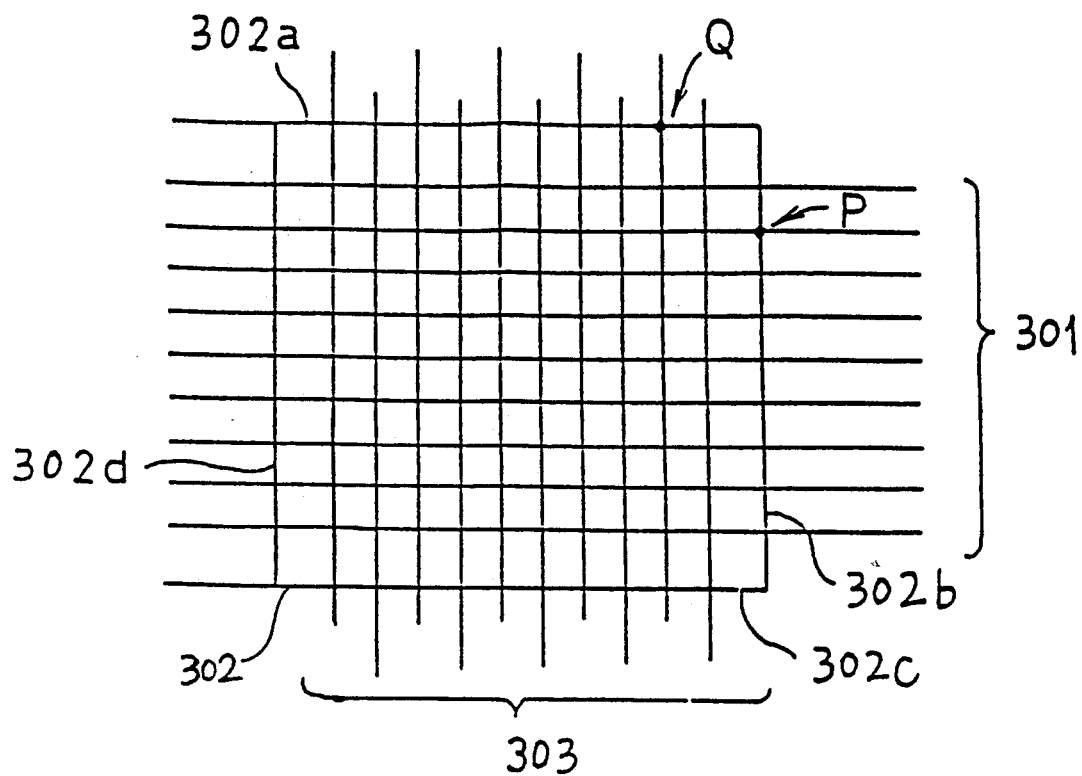
FIG. 11A is a plan view showing still another display electrode board used in a matrix-type display device of this invention.

FIG. 11A is a schematic plan view showing a display electrode board for use in the matrix type display device of the invention. This embodiment presents a matrix type display device which involves less possibility of an isolation defect between the bus lines and the spare lines. As FIG. 11A shows, a large number of source bus lines 303 which function as signal lines are arranged in parallel to one another and in orthogonal relation to a large number of gate bus lines 301 extending in parallel in a direction which function as scan lines. The gate bus lines 301 intersect the source bus lines 303 in a non-conducting state so as to sandwich a gate insulating film 313 therebetween which will be described hereinafter. In individual rectangular areas defined by the gate bus lines 301 and source bus lines 303 there are arranged pixel electrodes and TFTs, but those parts are not shown in FIG. 11A.

Spare lines 302 are arranged along the outer limits of the areas in which the gate bus lines 301 intersect the source bus lines 303. The spare lines 302 consist of two spare lines 302a and 302c extending in parallel to the gate bus lines 301, and two spare lines 302b and 302d extending in parallel to the source bus lines 303. The four spare lines 302a–302d are electrically interconnected.

Figure 11B:
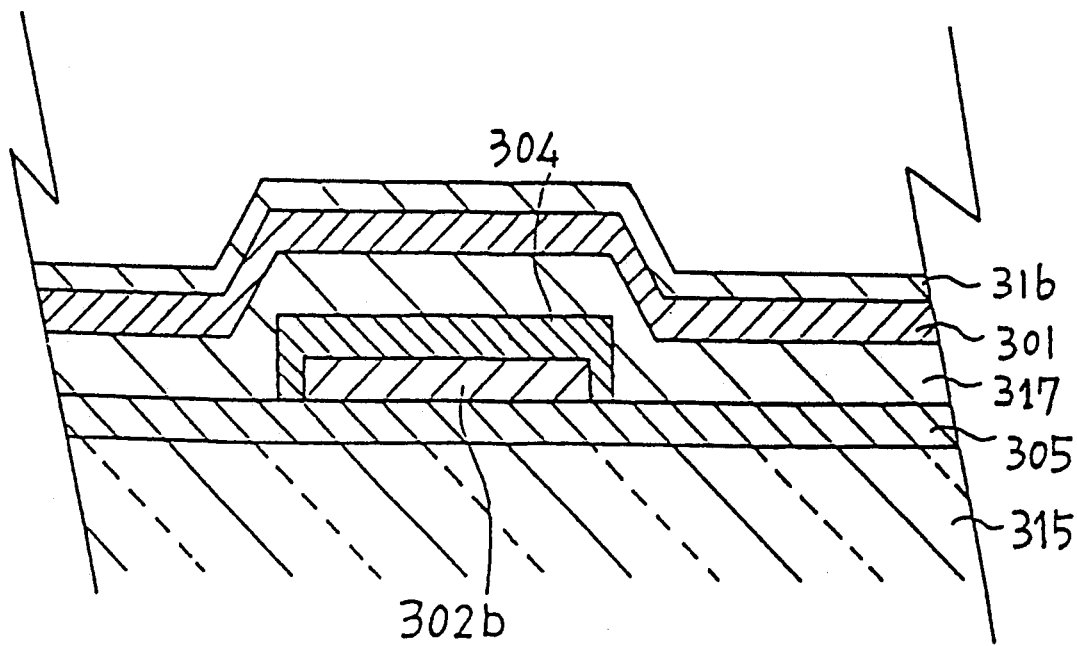
FIG. 11B is sectional view taken along a gate bus line at point P in FIG. 11A.

FIG. 11B is a section taken along a gate bus line 301 at point P in FIG. 11A. A base coat film 305 formed of $Ta_2O_5$, $Al_2O_5$, $Si_3N_4$, etc., is deposited on the entire surface of a glass substrate, and a spare line 302b is pattern-formed on the base coat film 305. The spare lines 302b and 302d are formed of an anodizable metal. In this example, Ta metal is used for this purpose. An anodized film is formed on the spare lines 302b and 302d. Anodized film 304 is formed by patterning spare lines 302 of Ta metal in an electrolyte of ammonium persulfate and then anodizing the patterned spare lines 302. Therefore, the anodized film 304 is composed of $Ta_2O_5$.

An insulating film 317 formed of $SiN_x$ or the like is deposited on the anodized film 304 over all. Gate bus lines 301 are arranged in an intersecting relation with the spare line 302b so as to sandwich the anodized film 304 and insulating film 317 therebetween. The gate bus line 301 is composed of a single layer of Ta, Al, Mo, Ti or the like or of a multiple metal layer of these materials. A protective film 316 is formed on the entire surface of the gate bus line 301.

Figure 11C:
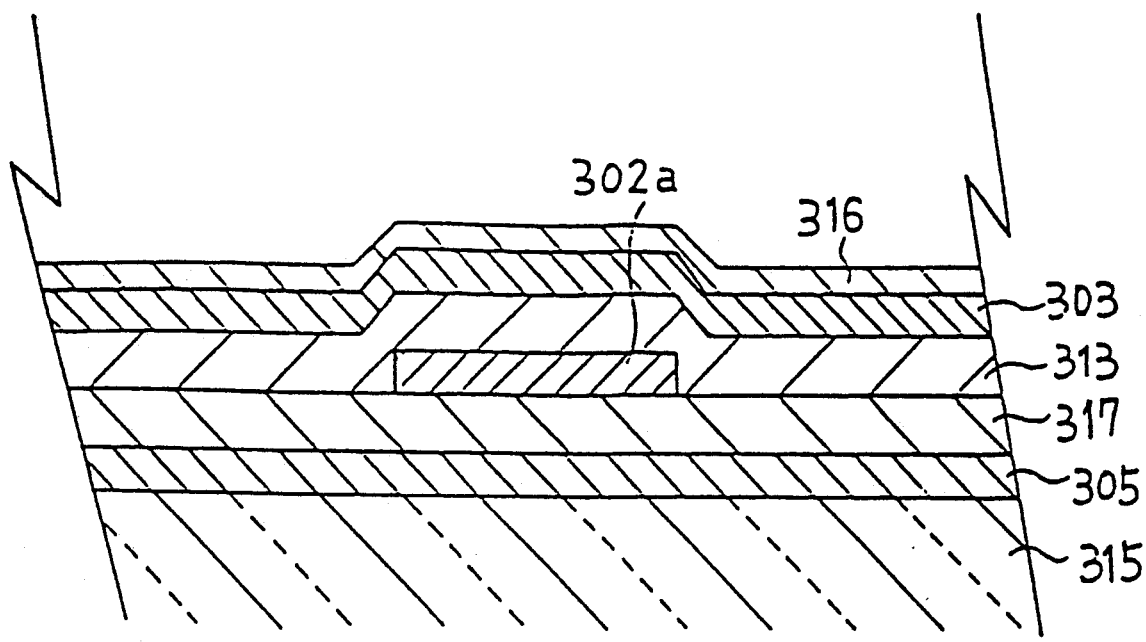
FIG. 11C is a sectional view taken along a source bus line at point Q in FIG. 11A.

FIG. 11C is a section taken along the source bus line 303 at point Q in FIG. 11A. The above mentioned insulating film 317 is placed all over the base coat film 305. The spare line 302a is pattern-formed on the insulating film 317, and a gate insulating film 313 is placed all over the spare line 302a. In the present example, spare lines 302a and 302c are simultaneously formed. The source bus lines 303 that are positioned on the spare line 302a intersect the spare line 302a so as to sandwich the insulating film 313 therebetween. The above mentioned protective film 316 is placed over entire area of the source bus lines 303. The spare line 302a and the spare line 302b shown in FIG. 11B are electrically connected via through-holes (not shown) provided in the insulating film 317 and the anodized film 304. Likewise, the spare lines 302a and 302d, spare lines 302b and 302c, and spare lines 302c and 302d are electrically connected.

In this example, the spare lines 302b, 302d intersect the gate bus lines 301 so as to sandwich the anodized film 304 and insulating film 317 therebetween. By interposing two insulating layers between the spare lines 302b, 302d and gate bus lines 301, possible insulation defects between the spare lines 302b, 302d and the gate bus lines 301 can be prevented.

Example 11

Figure 12:
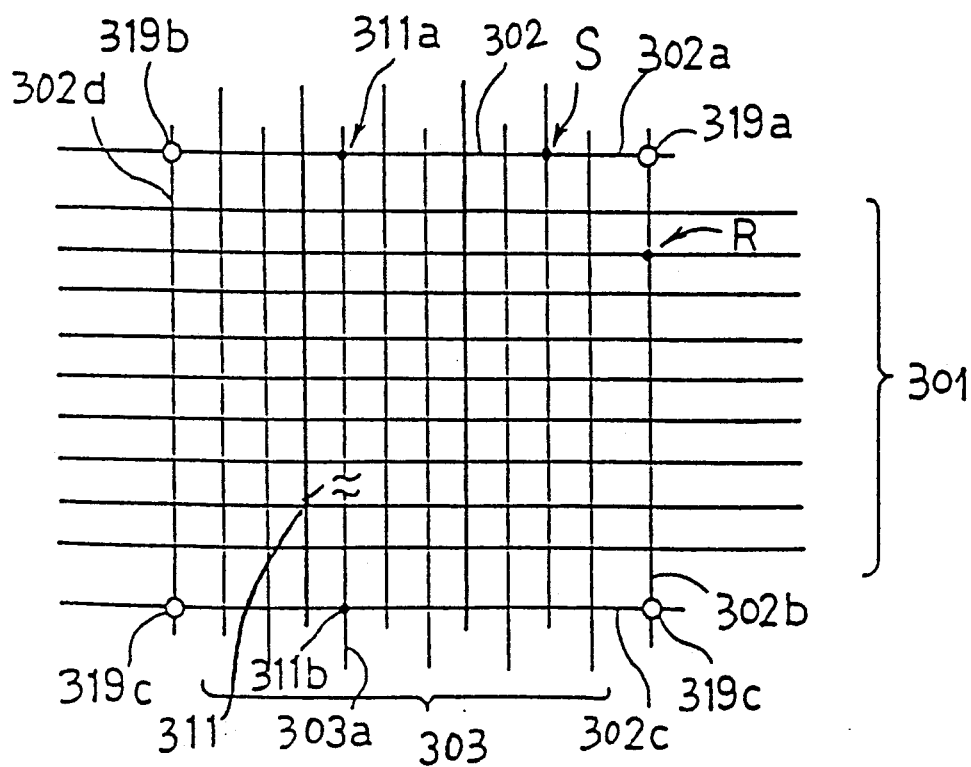
FIG. 12A is a plan view showing still another display electrode board used in a matrix-type display device of this invention.
FIG. 12B is a plan view showing a production process of the board of FIG. 12A.
FIG. 12C is sectional view taken along a gate bus line at point R in FIG. 12A.
FIG. 12D is a sectional view taken along a source bus line at point S in FIG. 12A.
Figure 12:
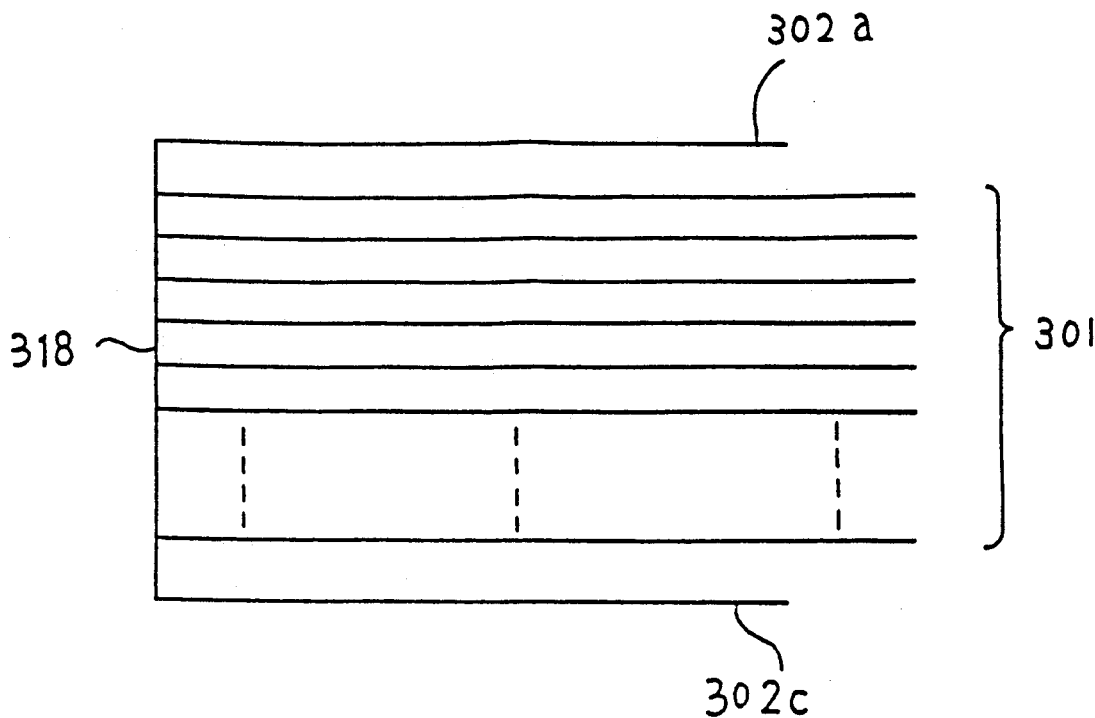
Figure 12:
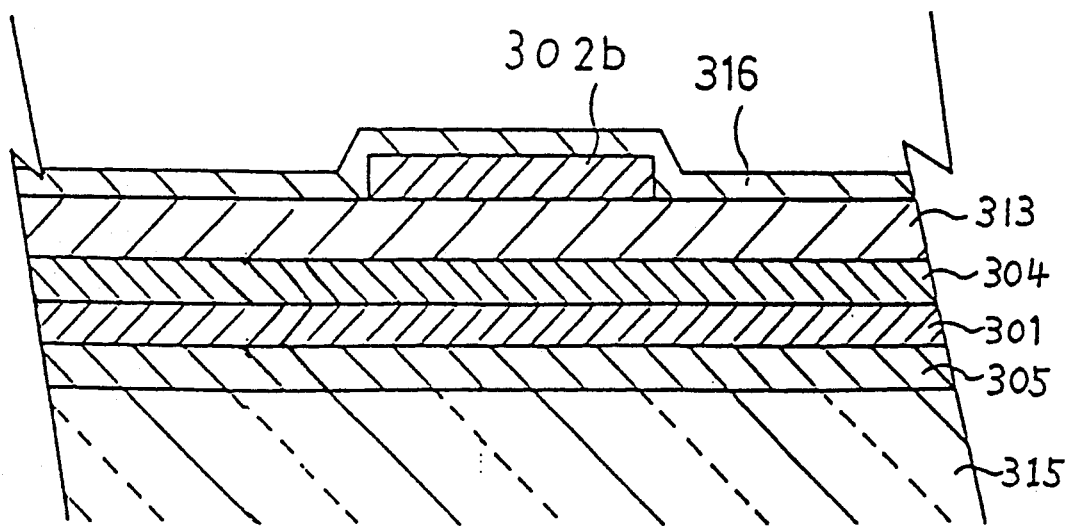
Figure 12:
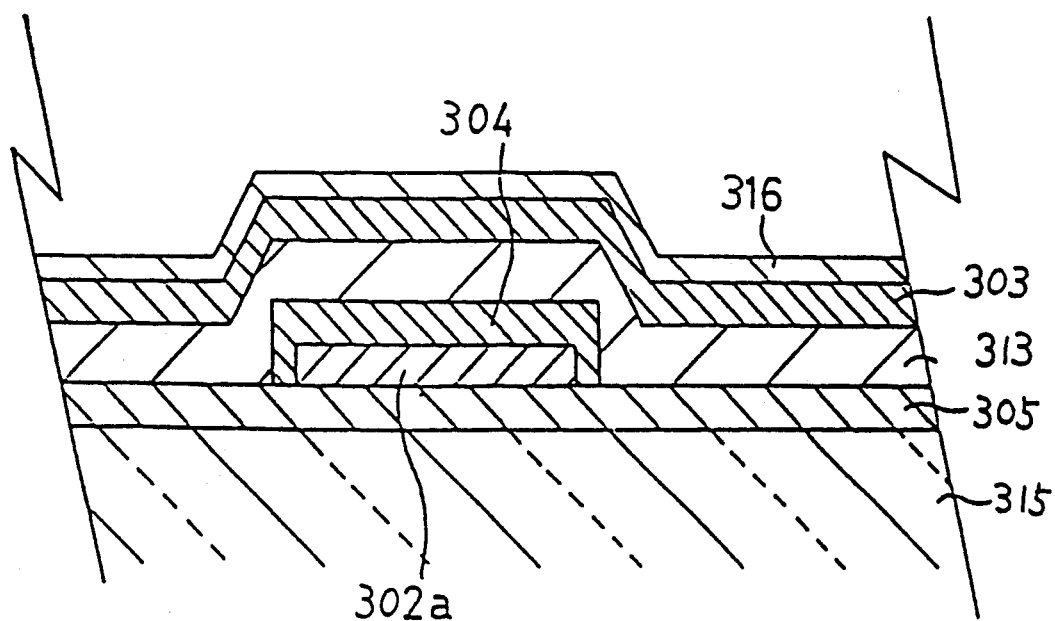

FIG. 12A is a schematic plan view showing a display electrode board used in another embodiment of the invention. FIG. 12B illustrates the process of manufacturing the board shown in FIG. 12A. As FIG. 12B shows, in this example, the spare lines 302a and 302c are formed simultaneously with the gate bus lines 301, and the lines 302a, 302c and 301 are electrically connected at one end by connecting lines 318. In this example, the gate bus lines 301, and the spare lines 302a and 302c are formed of Ta metal. An anodized film 304 (FIG. 12C) is formed on these lines 301 and lines 302. The anodized film 304 (FIG. 12C), as previously mentioned, is formed by immersing the board in an electrolyte of ammonium persulfate or the like, to thereby anodize it. After an anodized film 304 is formed, and before completion of the display electrode board as such, a connecting line 318 is severed from the spare lines 302a, 302c, and from the gate bus lines 301.

A gate insulating film 313 is placed on the entire surface of the anodized film 304. Source bus lines 303, and spare lines 302b, 302d are simultaneously pattern-formed on the gate bus lines 301 so as to intersect gate bus lines 301 and spare lines 302a, 302c (FIG. 12A).

FIG. 12C is a sectional view taken along gate bus line 301 at point R in FIG. 12A. The base coat film 305 formed of $Ta_2O_5$, $Al_2O_5$, $Si_3N_4$, or the like is deposited on the entire surface of the glass substrate 315, and the gate bus lines 301 are pattern-formed on the base coat film 305. The anodized film 304 described above is formed on the gate bus lines 301. The gate insulating film 313 formed of $SiN_x$ or the like is placed on the entire surface of the anodized film 304. The spare line 302b intersects the gate bus lines 301 so as to sandwich the gate insulating film 313 therebetween. Further, a protective film 316 is formed all over the spare line 302b.

FIG. 12D is a sectional view taken along the source bus line 303 at point S in FIG. 12A. As has been seen in FIG. 12C, the base coat film 305 is deposited on the entire surface of the glass substrate 315, and the spare line 302a is pattern-formed on the base coat film 305. The above-mentioned anodized film 304 is formed on the spare line 302a. The gate insulating film 313 is placed on the entire surface of the substrate 315, the gate insulating film 313 covering the anodized film 304. The source bus lines 303 are pattern formed on the gate insulating film 313. Further, the protective film 316 is formed on the entire surface of the source bus lines 303.

In this example, as shown in FIG. 12A, there are provided four joints 319a-319d at which the spare lines 302a 302d intersect. At these joints 319a-319d, the spare lines 302a-302d are not electrically connected. Therefore, the gate insulating film 313 is present between the spare lines 302a-302d.

In this example, if a breakdown occurs with any of the gate bus lines 301 or of the source bus lines 303, the bus line on which the breakdown is present and the spare line 302 are connected, and moreover, two of the four joints 319a-319d are connected.

By way of an example, consider that a breakdown 311 is to be corrected which has occurred on one source bus line 303a in FIG. 12A. First, a laser beam is applied to an intersecting point 311a between the source bus line 303a and the spare line 302a, so that the source bus line 303a and the spare line 302a are connected. Similarly, a laser beam is applied to an intersecting point 311b and the source bus line 303a and the spare line 302c are connected. Then, a laser beam is applied to the joints 319b and 319c so that the spare lines 302a, 302d, and 302c are electrically connected. Thus, portions of the defective source bus line 303a on both sides of the breakdown spot 311 are connected by the spare lines 302a, 302d, and 302c.

In this example, as FIG. 12C shows, the spare lines 302b and 302d (FIG. 12A) intersect the gate bus lines 301 so as to sandwich two insulating layers, that is, the anodized film 304 and the gate insulating film 313 therebetween. Likewise, as FIG. 12D shows, the spare lines 302a and 302c (FIG. 12A) intersect the source bus lines 303 so as to sandwich two layers, i.e., the anodized film 304 and the gate insulating layer 313 therebetween. By virtue of these two insulating layers, the possibility of insulation defect occurrence between the spare line 302 and these bus lines 301, 303 is reduced.

Example 12

Figure 13:
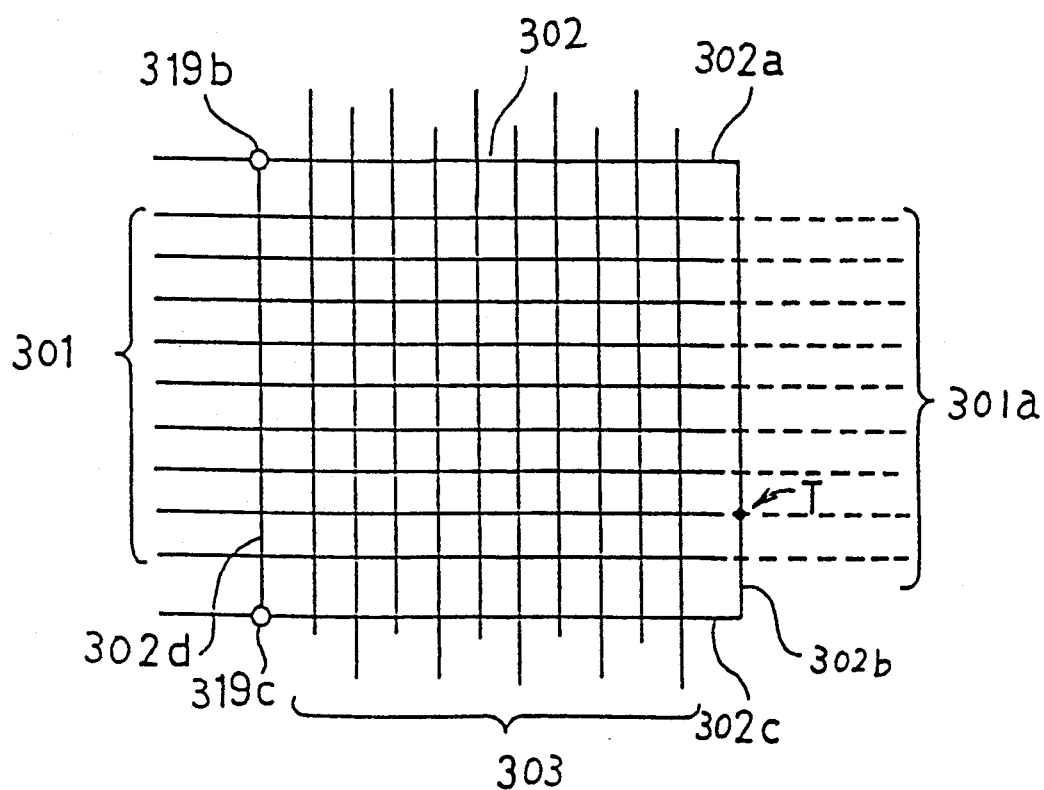
FIG. 13A is a plan view showing still another display electrode board used in a matrix-type display device of this invention.
FIG. 13B is a plan view showing a production process of the board of FIG. 13A.
FIG. 13C is a sectional view taken along a gate bus line at point T in FIG. 13A.
Figure 13:
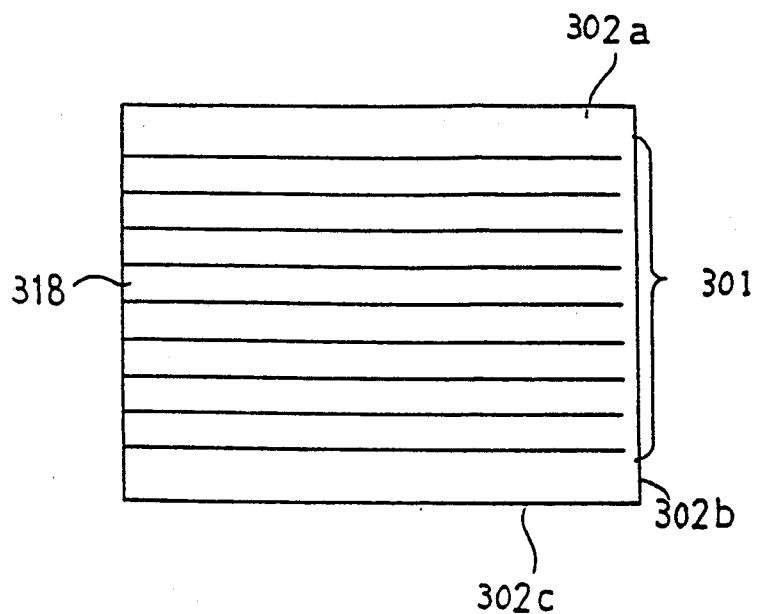
Figure 13:
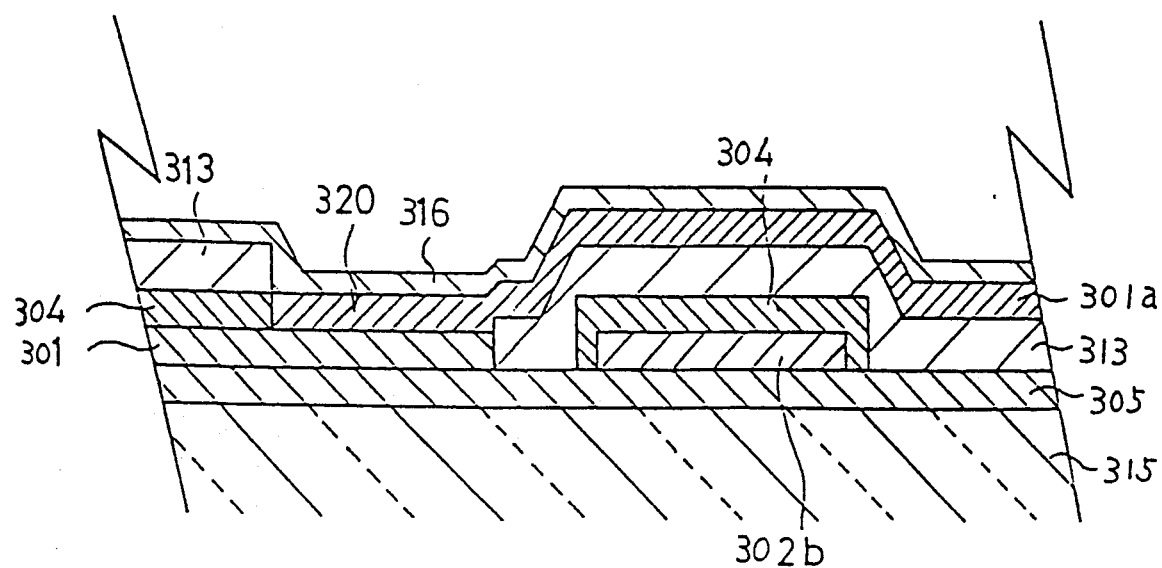

FIG. 13A is a schematic plan view showing a display electrode board used in another embodiment of the invention. FIG. 13B shows the process of manufacturing the board shown in FIG. 13A. FIG. 13C shows a section taken along the gate bus line 301 at point T in FIG. 13A. In this example, spare lines 302a, 302b, and 302c are formed on the base coat film 305 (FIG. 13C) simultaneously with gate bus lines 301. The spare lines 302a, 302c, and the gate bus lines 301 are electrically connected at one end thereof by a connecting line 318 (FIG. 13B). In this example, the gate bus lines 301, and spare lines 302a, 302b and 302c are formed of Ta metal. An anodized film 304 (FIG. 13C) is formed on these lines. The anodized film 304, as above mentioned, is formed by immersing the board in an electrolyte of ammonium persulfate or the like, thereby anodizing the board. After the anodized layer 304 is formed, and before the display electrode board is completed as such, the connecting line 318 is severed from the spare lines 302a and 302c and gate bus lines 301.

In this example, one end side of the gate bus lines 301 which is not connected to the connecting lines 318 is coated with a plastic coat medium prior to anodization, so that no anodized film 304 is formed on the one end. This plastic coat medium is removed after anodization.

A gate insulating film 313 is deposited on the anodized film 304 all over the substrate 315. The gate insulating film 313 formed on that one end side of the gate bus lines 301 on which no anodized film 304 is formed is removed by an etching technique. There is provided a through-hole 320 as shown in FIG. 13C. Spare line 302d, source bus lines 303, and gate bus lines 301a are pattern-formed simultaneously on the gate insulating film 313 in an orthogonal relation with spare lines 302a, 302c, and gate bus lines 301. In FIG. 13A, the gate bus lines 301a are shown by broken lines. As shown in FIG. 13C, one end of each gate bus line 301a is on the above-mentioned through-hole 320. In this example, therefore, one end of each gate bus line 301 is connected to gate bus line 301a via the through-hole 320 and is drawn onto the gate insulating film 313. The spare line 302b is located below the gate bus lines 301a and intersects the gate bus lines 301a so as to sandwich the anodized film 304 formed on the spare line 302b and the gate insulating film 313 therebetween.

In the same way as in the embodiment shown in FIG. 12A, the gate insulating film 313 is present between the spare line 302d and the spare lines 302a, 302b, at joints 319b and 319c shown in FIG. 13A, so that these lines are electrically isolated. In this example, where one breakdown spot present on any source bus line 303 is to be corrected using the spare line 302, connection at joints 319b and 319c is unnecessary. Where two breakdowns have occurred on different source bus lines, the spare line 302d and the spare line 302a are electrically connected at joints 319b and 319c. Further, spare lines 302a and 302c are each divided into two parts at suitable locations, and thus breakdowns are corrected.

In the present example, between the spare lines 302a, 302c and the source bus lines 303, and between the spare line 302b and the source bus lines 301a are present the anodized film 304 formed on these spare lines, and the gate insulating film 313. Moreover, the anodized film 304 formed on the gate bus lines 301, and the gate insulating layer 313 are present between the gate bus lines 301 and the spare line 302d. In this example, occurrence of insulation defects between the spare line 302 and the bus lines is prevented by the two insulating layers in this way.

Example 13

Figure 14:
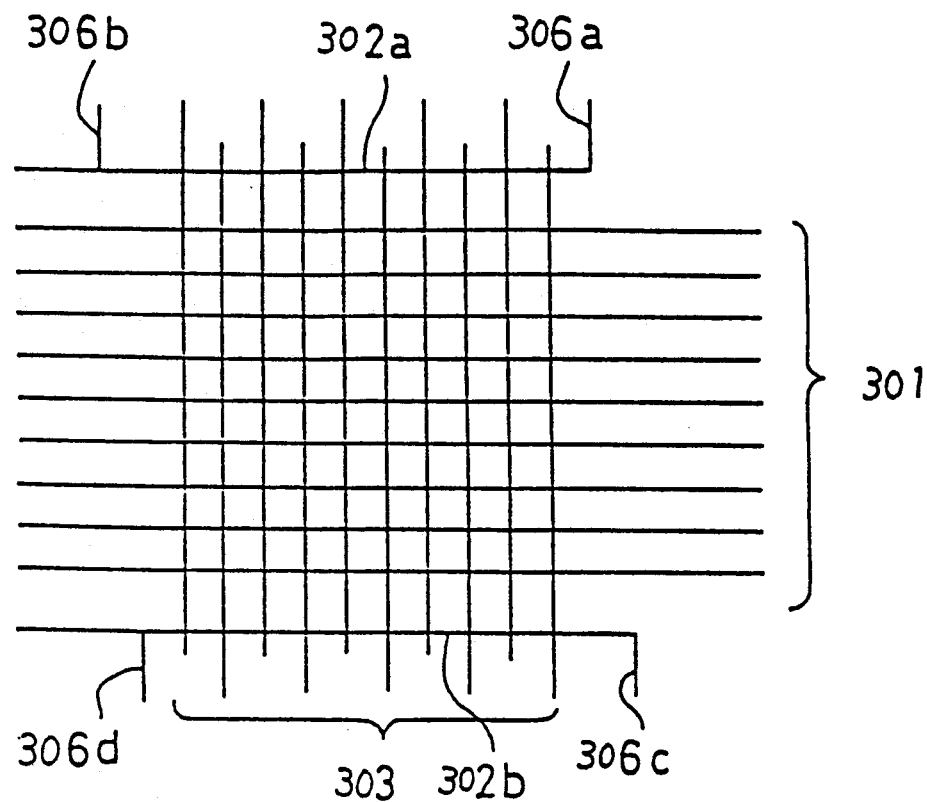
FIG. 14A is a plan view showing still another display electrode board used in a matrix-type display device of this invention.
FIG. 14B is a plan view showing a source driver film connected to the board of FIG. 14A.
Figure 14:
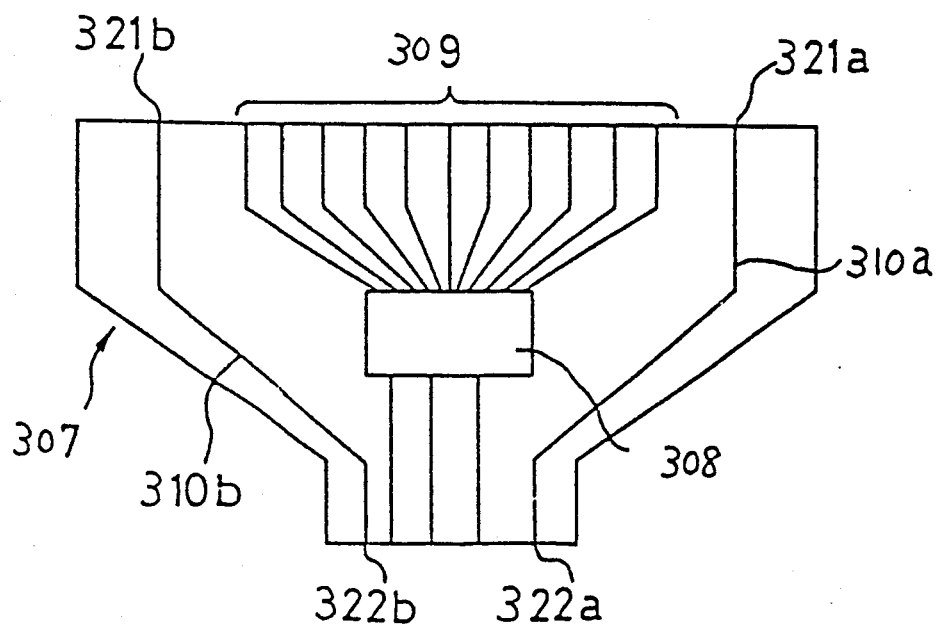

FIG. 14A is a schematic plan view showing a display electrode board used in another embodiment of the invention. In the present example, scan signals are applied from opposite ends of each gate bus line 301. Therefore, spare lines intersecting the gate bus lines are not required. In the same way as is the case with the embodiment shown in FIG. 11A, a base coat film is deposited on a glass substrate, and gate bus lines 301, spare lines 302a, 302b, and connecting lines (not shown) are formed on the base coat film. After an anodized film 304 is formed on the gate bus lines 301, spare lines 302a, 302b, and the connecting lines, the connecting lines are severed from the gate bus lines 301 and spare lines 302a, 302b. In this example, the spare lines 302a and 302b have lead-out lines 306a, 306b, and lead-out lines 306c, 306d respectively. An insulating film of $SiN_x$ or the like is placed on the anodized film 304 and, on top of it, source bus lines 303 are pattern-formed.

In the present example, the spare lines 302a and 302b are not connected on the display electrode board, nor do they intersect. The spare lines 302a and 302b are led onto a source driver film through lead-out lines 306a, 306b and lead-out lines 306c, 306d respectively. FIG. 14B shows a source driver film 307 used in the present embodiment. On the source driver film 307 there is provided a source driver IC 308 which is formed with source bus connecting lines 309 connected to the source bus lines 303 shown in FIG. 14A. On-film lines 310a and 310b are provided on opposite outer sides of the source bus connecting lines 309 and IC 308. One end 321a of the on-film line 310a is connected to the aforesaid lead-out line 306a. Similarly, one end 321b of the on-film line 310b is connected to the lead-out line 306b. The other ends 322a and 322b of the on-film lines 310a and 310b are connected to connecting lines led onto the circuit board.

Similarly, the lead-out lines 306c and 306d are led to on-the-source driver film lines of the same configuration as shown in FIG. 14B and are, in turn, connected to connecting lines on the circuit board. The connecting line on the circuit board which is connected to the lead-out line 306c is electrically connected to the connecting line connected to the aforesaid lead-out line 306a. Likewise, the connecting line connected to the lead-out line 306d is electrically connected to the connecting line connected to the lead-out line 306b. In this way, the spare lines 302a and 302b are electrically connected on a circuit board outside of the display electrode board.

In the present example, the spare lines 302a and 302b intersect the source bus lines 303 through the anodized film formed on the spare lines 302a and 302b and further through the insulating film formed thereon. Through the provision of two such insulating layers, the possibility of insulation defect occurrence between the spare lines 302a, 302b on one hand and the source bus lines 303 on the other is reduced.

In the above described Example 13, all the spare lines 302a-302d intersect the bus lines extending in parallel in a direction; however, it may be arranged that the spare lines intersect only some of the parallel bus lines.

In the various forms of matrix-type display device exemplified in Examples 10 through 13, the possibility of insulation defect occurrence between the bus lines on one and the spare lines on the other is reasonably reduced. According to the invention, therefore, it is possible to achieve improved yield and good cost economy in display device manufacturing.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which this invention pertains.

What is claimed is:

1. A matrix-type display device comprising:
   a display electrode board that has a plurality of pixel electrodes arranged into a matrix and a set of scan lines extending in parallel in one direction and a set of signal lines extending in an orthogonal direction to said scan lines so that these lines are arranged between the adjacent pixel electrodes,
   a plurality of pairs of spare lines formed of an anodizable metal, each of which intersects at least some of said scan lines and/or some of said signal lines at each end thereof so as to sandwich at least one insulating film therebetween, and
   lead-out lines, each of which is connected to the ends of a respectively corresponding pair of spare lines,
   wherein said lead-out lines are connected to external connecting lines, which are outside of said display electrode board, so that said lead-out lines, that extend toward the direction of said scan lines or said signal lines connected to said spare lines, are connected to each other through said external connecting lines.

2. A matrix-type display device comprising:
   a display electrode board having,
   a plurality of pixel electrodes that are arranged into a matrix,
   a set of scan lines extending in parallel in one direction and a set of signal lines extending in an orthogonal direction to said scan lines so that these lines are arranged between the adjacent pixel electrodes,
   a first pair of spare lines formed of an anodizable metal and intersecting at least some of said scan lines and/or some of said signal lines at both ends thereof so as to sandwich at least two insulating films, one of said films being an anodized film formed on said spare lines, and
   a second pair of spare lines that extend in parallel to said scan lines or said signal lines which intersect said first pair of spare lines, lead-out lines each of which is connected to the ends of said first pair of spare lines and said second pair of spare lines, said second pair of spare lines connecting both ends of one of said first pair of spare lines with both ends of the other of said first pair of spare lines, wherein said lead-out lines are connected to external connecting lines, which are outside of said display electrode board, so that said lead-out lines can be connected to each other through said external connecting lines.

3. A matrix-type display device according to claim 2, wherein said second pair of spare lines respectively intersect said scan lines or said signal lines which do not intersect said first pair of spare lines, so as to sandwich at least two insulating films therebetween, said second pair of spare lines being formed of an anodizable metal, and one of said insulating films being an anodized film on said second pair of spare lines.

4. A matrix-type display device comprising:
a display electrode board having,
a plurality of pixel electrodes that are arranged into a matrix,
a set of scan lines extending in parallel in one direction and a set of signal lines extending in an orthogonal direction so that these lines are arranged between the adjacent pixel electrodes,
a first pair of spare lines formed of an anodizable metal and intersecting at least some of said scan lines or some of said signal lines at both ends thereof so as to sandwich at least two insulating films, one of said films being an anodized film formed on said spare lines, and
a second pair of spare lines extending parallel to said scan lines or said signal lines intersecting said first pair of spare lines, each line of said second pair of spare lines intersecting an end of each of said first pair of spare lines in a non-conducting state,
wherein each line of the first pair of spare lines is connectable to each line of the second pair of spare lines.

5. A matrix-type display device comprising:
a display electrode board that has a plurality of pixel electrodes arranged into a matrix and a set of scan lines extending in parallel in one direction and a set of signal lines extending in an orthogonal direction to said scan lines so that these lines are arranged between the adjacent pixel electrodes,
a plurality of pairs of spare lines formed of an anodizable metal, each of which intersects at least some of said scan lines and/or some of said signal lines at each end thereof so as to sandwich at least two insulating films therebetween, one of said films being an anodized film formed on said spare lines, and
lead-out lines, each of which is connected to the ends of a respectively corresponding pair of spare lines,
wherein said lead-out lines are connected to external connecting lines, which are outside of said display electrode board, so that said lead-out lines, that extend toward the direction of said scan lines or said signal lines connected to said spare lines, are connected to each other through said external connecting lines.

6. A matrix-type display device comprising:
a display electrode board that has a plurality of pixel electrodes arranged into a matrix and a set of scan lines extending in one direction and a set of signal lines extending in an orthogonal direction to said scan lines, the signal lines being divided into plural blocks of signal line groups, the scan lines being divided into plural blocks of scan line groups, a plurality of pairs of spare lines, each of which intersects some of said scan lines and/or some of said signal lines at each end thereof so as to sandwich at least two insulating films therebetween, one of said films being an anodized film, and lead-out lines, each of which is connected to the ends of a respectively corresponding pair of spare lines, wherein said lead-out lines are connected to external connecting lines, which are outside said display electrode board, so that said lead-out lines, that extend toward the direction of said scan lines or said signal lines to said spare lines, are connected to each other through said external connecting lines, and the length of said spare lines is shorter than the length which is the shorter one between said signal line and scan line so that the correction of a breakdown spot entails little or no increase in electrical resistance, load capacity, and entails no effective increase of signal delay.

7. A matrix-type display device comprising:
a display electrode board that has a plurality of pixel electrodes arranged into a matrix and a set of scan lines extending in one direction and a set of signal lines extending in an orthogonal direction to said scan lines, the signal lines being divided into plural blocks of signal line groups, the scan lines being divided into plural blocks of scan line groups,
a plurality of pairs of spares lines, each of which intersects some of said scan lines and/or some of said signal lines at each end thereof so as to sandwich at least two insulating films therebetween, one of said films being an anodized film, and
lead-out lines, each of which is connected to the ends of a respectively corresponding pair of spare lines,
wherein said lead-out lines are connected to external connecting lines, which are outside said display electrode board, so that said lead-out lines, that extend toward the direction of said scan lines or said signal lines to said spare lines, are connected to each other through said external connecting lines, and
wherein said pair of spare lines having two parallel lines parallel to either said signal lines or said scan lines,
and two adjacent pair of spare lines are connected through said two lines, ends of which are connecting points between said two parallel lines and said lead-out lines.

8. A matrix-type display device according to claim 1 or 3, wherein said spare lines have a portion in parallel to the signal lines and scan lines having lead-out terminals, said parallel portion of spare lines located below and intersecting said scan lines, and
wherein said lead-out lines are connected to external connecting lines outside of said display electrode board, said lead-out lines extend toward the direction of said scan lines or said signal lines to which said spare lines are connected to each other through said external connecting lines.

9. A matrix-type display according to claim 1, 3, or 5, wherein said spare lines have a portion parallel to said scan lines, said spare lines having lead-out terminals, and said parallel portion of said spare lines being located below,
wherein said lead-out terminals are connected to external connecting lines, outside of said display electrode board, said lead-out terminals extending toward the direction of said signal lines to which said spare lines are connected to each other through said external connecting lines.

* * * * *